(12) United States Patent
Jiang et al.

(10) Patent No.: US 9,094,665 B2
(45) Date of Patent: Jul. 28, 2015

(54) DIGITAL WATERMARKING BASED METHOD FOR OBJECTIVELY EVALUATING QUALITY OF STEREO IMAGE

(71) Applicant: Ningbo University, Ningbo, Zhejiang (CN)

(72) Inventors: Gangyi Jiang, Zhejiang (CN); Wujie Zhou, Zhejiang (CN); Mei Yu, Zhejiang (CN); Feng Shao, Zhejiang (CN); Zongju Peng, Zhejiang (CN); Fen Chen, Zhejiang (CN); Xiaodong Wang, Zhejiang (CN); Fucui Li, Zhejiang (CN)

(73) Assignee: Ningbo University, Ningbo, Zhejiang Province (CN)

(*) Notice: Subject to any disclaimer, the term of this patent is extended or adjusted under 35 U.S.C. 154(b) by 0 days.

(21) Appl. No.: 14/216,923

(22) Filed: Mar. 17, 2014

(65) Prior Publication Data
US 2015/0093016 A1    Apr. 2, 2015

(30) Foreign Application Priority Data
Sep. 29, 2013   (CN) .......................... 2013 1 0463984

(51) Int. Cl.

| | |
|---|---|
| *G06K 9/00* | (2006.01) |
| *H04N 13/00* | (2006.01) |
| *G06T 7/00* | (2006.01) |
| *H04N 19/625* | (2014.01) |
| *H04N 19/85* | (2014.01) |
| *H04N 19/467* | (2014.01) |
| *G06T 1/00* | (2006.01) |

(52) U.S. Cl.
CPC .......... *H04N 13/0048* (2013.01); *G06T 1/0028* (2013.01); *G06T 7/0002* (2013.01); *H04N 13/0059* (2013.01); *H04N 19/467* (2014.11); *H04N 19/625* (2014.11); *H04N 19/85* (2014.11); *G06T 2201/005* (2013.01); *G06T 2207/10012* (2013.01); *G06T 2207/30168* (2013.01); *H04N 2013/0074* (2013.01)

(58) Field of Classification Search
None
See application file for complete search history.

(56) References Cited

U.S. PATENT DOCUMENTS

| 8,953,873 B2* | 2/2015 | Jiang et al. ..................... 382/154 |
| 2010/0321382 A1* | 12/2010 | Amaratunga et al. ......... 345/419 |
| 2011/0032327 A1* | 2/2011 | Ikeda et al. ..................... 348/42 |

(Continued)

OTHER PUBLICATIONS

Yu et al., "New Block-Relationships Based Stereo Image Watermarking Algorithm", ICSNC 2011: The Sixth International Conference on Systems and Networks Communications.*

(Continued)

*Primary Examiner* — Aaron W Carter

(57) ABSTRACT

A digital watermarking based method for objectively evaluating quality of stereo image includes: at transmitting terminal, extracting characteristics of the left-view image and the right-view image of an undistorted stereo image in DCT domain and embedding digital watermarking obtained by processing quantization coding on the characteristics into the DCT domain; at a receiving terminal, detecting the digital watermarking embedded in the distorted stereo image and processing decoding and inverse quantization to extract the embedded characteristics of the left-view image and the right-view image of the stereo image, obtaining a stereo perception value and a view quality value of the distorted stereo image according to the embedded characteristics, and finally obtaining an objective quality score of the distorted stereo image utilizing a support vector regression model.

10 Claims, 4 Drawing Sheets

(56) References Cited

U.S. PATENT DOCUMENTS

| | | | |
|---|---|---|---|
| 2011/0063421 A1* | 3/2011 | Kubota | 348/52 |
| 2011/0311147 A1* | 12/2011 | Pahalawatta et al. | 382/197 |
| 2013/0002814 A1* | 1/2013 | Park et al. | 348/43 |
| 2013/0016186 A1* | 1/2013 | Atanassov et al. | 348/47 |
| 2013/0083002 A1* | 4/2013 | Hwang et al. | 345/419 |
| 2013/0155192 A1* | 6/2013 | Hsiao et al. | 348/46 |
| 2013/0314404 A1* | 11/2013 | Jachalsky et al. | 345/419 |
| 2014/0029000 A1* | 1/2014 | Jiang et al. | 356/125 |
| 2014/0064604 A1* | 3/2014 | Jiang et al. | 382/154 |
| 2014/0169661 A1* | 6/2014 | Jiang et al. | 382/154 |
| 2014/0320598 A1* | 10/2014 | Kawano et al. | 348/43 |
| 2014/0348418 A1* | 11/2014 | Ishikawa | 382/154 |
| 2015/0093016 A1* | 4/2015 | Jiang et al. | 382/154 |

OTHER PUBLICATIONS

Yu et al. "A New Stereo Image Watermarking Method for 3D Media", 2011.*

Duan et al. "Objective Quality Assessment of Stereoscopic Images based on Spectral and Distortion Analyses", International Journal of Digital Content Technology and its Applications (JDCTA), vol. 7, No. 8, Apr. 2013.*

Zhou et al., "Subjective Quality Analyses of Stereoscopic Images in 3DTV System", 2011 IEEE (VCIP), Nov. 2011.*

Luo et al., "Stereo Image Watermarking Scheme for Authentication with Self-Recovery Capability Using Inter-view Reference Sharing", Springer Science+Business Media, May 3, 2013.*

* cited by examiner

DIGITAL WATERMARKING BASED METHOD FOR OBJECTIVELY EVALUATING QUALITY OF STEREO IMAGE

CROSS REFERENCE OF RELATED APPLICATION

The present application claims priority under 35 U.S.C. 119(a-d) to CN 201310463984.2, filed Sep. 29, 2013.

BACKGROUND OF THE PRESENT INVENTION

1. Field of Invention

The present invention relates to a method for objectively evaluating quality of stereo image, and more particularly to a digital watermarking based method for objectively evaluating quality of stereo image.

2. Description of Related Arts

With the rapid development of communication technology and multimedia technology, stereo image processing technology is gradually applied in various fields such as three-dimensional video conference system, virtual reality, remote industrial control, distance education and medical treatment, automatic navigation and consumer electronics. In a stereo image compression or transmission system, the quality of the compressed or transmitted stereo image is often utilized for evaluating the advantages and disadvantages of the system or adjusting the relative parameters thereof, so as to achieve a better compression or transmission effect. Since human beings are the final receiver of the stereo image, the subjective evaluation of the stereo image by the human beings is considered to be the most reliable. However, the subjective evaluation of the stereo image can not be described with a mathematical model and is easily influenced and restricted by other factors, and thus is not suitable for engineering application. Objectively evaluating quality of the stereo image is alternative method for this purpose. According to the dependence on the original stereo image, the methods for objectively evaluating stereo image are classified into three categories: FR (Full Reference), RR (Reduced-Reference) and NR (No Reference). The full reference method for objectively evaluating stereo image needs an integrated original stereo image for reference, and is suitable for design of stereo image encoder and performance comparison between different stereo image encoders. The no reference method for objectively evaluating stereo image needs no original stereo image for reference, and is mainly utilized for evaluating known degradation of images such as blocking effect, ringing effect and fuzzy distortion, and thus the application thereof is greatly limited. By contrast, the reduced-reference method for objectively evaluating stereo image is a method between the full reference method and the no reference method. The reduced-reference method takes advantage of part of the characteristic information of the reference stereo image for evaluating perceived quality of distorted stereo image, requires a small amount of data for storing or transmitting, and has high reliability. Especially in real-time communication system, the method can be utilized for monitoring perceived quality of the stereo image and adjusting the code rate thereof, so as to achieve better visual effects.

SUMMARY OF THE PRESENT INVENTION

A technical problem to be solved by the present invention is to provide a digital watermarking based method for objectively evaluating quality of stereo image, which is capable of well predicting human eye's subjective perception on stereo image and is in accordance with visual characteristics of human eyes.

Accordingly, in order to solve the technical problems mentioned above, the present invention provides technical solutions as follows. A digital watermarking based method for objectively evaluating quality of stereo image, comprising following steps of:

①-1 at a transmitting terminal, denoting an original undistorted stereo image as $S_{org}$, denoting a left-view image of $S_{org}$ as $L_{org}$ and a right-view image of $S_{org}$ as $R_{org}$; dividing $L_{org}$ and $R_{org}$ respectively into $$\frac{M \times N}{8 \times 8}$$

image blocks which are non-overlapped with each other and have a size of 8×8, wherein M is a width of $L_{org}$ or $R_{org}$, N is a height of $L_{org}$ or $R_{org}$;

①-2 processing discrete cosine transform (DCT) on each image block in $L_{org}$ and $R_{org}$, so as to obtain a DCT coefficient matrix of each image block in $L_{org}$ and $R_{org}$;

①-3 processing coefficient reorganization on all DTC coefficients in the DCT coefficient matrix of all of the image blocks in $L_{org}$ and $R_{org}$, so as to obtain 10 coefficient reorganized matrixes which are different from each other and respectively corresponding to $L_{org}$ and $R_{org}$, denoting an n'th coefficient reorganized matrix corresponding to $L_{org}$ as $S_{org}$, denoting an n'th coefficient reorganized matrix corresponding to $R_{org}$ as $S_{R,org}^{n'}$, wherein DCT coefficients having a same coordinate position in the DCT coefficient matrixes of all the image blocks in $L_{org}$ are located in a same coefficient reorganized matrix, and DCT coefficients having a same coordinate position in the DCT coefficient matrixes of all the image blocks in $R_{org}$ are located in a same coefficient reorganized matrix, wherein $1 \leq n' \leq 10$;

①-4 calculating an absolute value matrix of a difference value of each coefficient reorganized matrix corresponding to $L_{org}$ and each coefficient reorganized matrix corresponding to $R_{org}$, denoting an absolute value matrix of a difference value of an n' th coefficient reorganized matrix $S_{L,org}^{n'}$ corresponding to $L_{org}$ and an n' th coefficient reorganized matrix $S_{R,org}^{n'}$ corresponding to $R_{org}$ as $D_{org}^{n'}$, denoting an l th coefficient of $D_{org}^{n'}$ as $D_{org}^{n'}(l)$, wherein $D_{org}^{n'}(l) = |S_{L,org}^{n'}(l) - S_{R,org}^{n'}(l)|$;

calculating an average value and a standard deviation of the absolute value matrix of the difference value of each coefficient reorganized matrix corresponding to $L_{org}$ and each coefficient reorganized matrix corresponding to $R_{org}$, respectively denoting the average value and the standard deviation of $D_{org}^{n'}$ as $\mu_r^{n'}$ and $\sigma_r^{n'}$, wherein $$\mu_r^{n'} = \frac{1}{L_{n'}} \sum_{l=1}^{L_{n'}} D_{org}^{n'}(l),$$

$$\sigma_r^{n'} = \sqrt{\frac{1}{L_{n'}-1} \sum_{l=1}^{L_{n'}} (D_{org}^{n'}(l) - \mu_r^{n'})^2};$$

wherein $S_{L,org}^{n'}(l)$ represents an l th DCT coefficient in $S_{L,org}^{n'}$, $S_{R,org}^{n'}(l)$ represents an l th DCT coefficient in $S_{R,org}^{n'}$, wherein "||" is an absolute value sign, $1 \leq l \leq L_{n'}$, wherein $L_{n'}$ represents a total number of DCT coefficients in $S_{L,org}^{n'}$ or $S_{R,org}^{n'}$;

①-5 respectively processing filtering on all of the DCT coefficients in the DCT coefficient matrix of each image block in $L_{org}$ and $R_{org}$ utilizing Watson sensitivity operator, so as to obtain a filtered DCT coefficient matrix of each image block in $L_{org}$ and $R_{org}$;

①-6 respectively processing coefficient reorganization on the DCT coefficients of the filtered DCT coefficient matrix of all the image blocks in $L_{org}$ and $R_{org}$ utilizing the same way of coefficient reorganization as thereof in the step ①-3, so as to obtain 10 filtered coefficient reorganized matrixes which are respectively corresponding to $L_{org}$ and $R_{org}$, and different from each other, denoting an n'th filtered coefficient reorganized matrix corresponding to $L_{org}$ as $\overline{S}_{L,org}{}^{n'}$, denoting an n'th filtered coefficient reorganized matrix corresponding to $R_{org}$ as $\overline{S}_{R,org}{}^{n'}$, wherein filtered DCT coefficients having a same coordinate position in the filtered DCT coefficient matrixes of all the image blocks in $L_{org}$ are located in a same filtered coefficient reorganized matrix, and filtered DCT coefficients having a same coordinate position in the filtered DCT coefficient matrixes of all the image blocks in $R_{org}$ are located in a same filtered coefficient reorganized matrix, wherein $1 \le n' \le 10$;

①-7 according to all of the filtered DCT coefficients in the 10 filtered coefficient reorganized matrixes respectively corresponding to $L_{org}$ and $R_{org}$ calculating a first sensitivity threshold, which is denoted as T1, wherein $$T1 = \alpha \times \sum_{k=1}^{10} \sum_{l=1}^{L_k} |\overline{S}_{org}^k(l)| / \sum_{k=1}^{10} L_k,$$

wherein $\alpha$ is a sensitivity threshold regulatory factor, $1 \le k \le 10$, $1 \le l \le L_k$, wherein $L_k$ represents a total number of filtered DCT coefficients of a k th filtered coefficient reorganized matrix in the 10 filtered coefficient reorganized matrixes respectively corresponding to $L_{org}$ or $R_{org}$, wherein $\overline{S}_{org}^k(l)$ represents an l th filtered DCT coefficient of a kth filtered coefficient reorganized matrix in the 10 filtered coefficient reorganized matrixes, wherein "||" is an absolute value sign;

①-8 selecting filtered DCT coefficients in each filtered coefficient reorganized matrix respectively corresponding to $L_{org}$ and $R_{org}$ which are greater than the first sensitivity threshold T1 to be determined as visual sensitivity coefficients, calculating proportions of visual sensitivity coefficients in each filtered coefficient reorganized matrix respectively corresponding to $L_{org}$ and $R_{org}$, denoting a proportion of visual sensitivity coefficients in an n' th filtered coefficient reorganized matrix $\overline{S}_{L,org}{}^{n'}$ corresponding to $L_{org}$ as $P_r^L(n')$, wherein $P_r^L(n')=R_T^L(n')/R^L(n')$, denoting a proportion of visual sensitivity coefficients in an n'th filtered coefficient reorganized matrix $\overline{S}_{R,org}{}^{n'}$ corresponding to $R_{org}$ as $P_r^R(n')$, wherein $P_r^R(n')=R_T^R(n')/R^R(n')$, wherein $R_T^L(n')$ represents a number of visual sensitivity coefficients in the n' th filtered coefficient reorganized matrix $\overline{S}_{L,org}{}^{n'}$ corresponding to $L_{org}$, $R^L(n')$ represents a total number of filtered DCT coefficients in the n'th filtered coefficient reorganized matrix $\overline{S}_{L,org}{}^{n'}$ corresponding to $L_{org}$, $R_T^R(n')$ represents a number of visual sensitivity coefficients in the n'th filtered coefficient reorganized matrix $\overline{S}_{R,org}{}^{n'}$ corresponding to $R_{org}$, and $R^R(n')$ represents a total number of filtered DCT coefficients in the n'th filtered coefficient reorganized matrix $\overline{S}_{R,org}{}^{n'}$ corresponding to $R_{org}$;

①-9 processing quantization coding on the average value and the standard deviation of the absolute value matrix of the difference value of each coefficient reorganized matrix corresponding to $L_{org}$ and each coefficient reorganized matrix corresponding to $R_{org}$ for serving as a first digital watermarking information;

processing quantization coding on a proportion of the visual sensitivity coefficients in each filtered coefficient reorganized matrix corresponding to $L_{org}$ for serving as a second digital watermarking information;

processing quantization coding on a proportion of the visual sensitivity coefficients in each filtered coefficient reorganized matrix corresponding to $R_{org}$ for serving as a third digital watermarking information;

utilizing a dither modulation digital watermarking embedding method, respectively embedding the first digital watermarking information into a fourth coefficient reorganized matrix $S_{L,org}^4$ corresponding to $L_{org}$ and a fourth coefficient reorganized matrix $S_{R,org}^4$ corresponding to $R_{org}$, respectively embedding the second digital watermarking information into a fifth coefficient reorganized matrix $S_{L,org}^5$ corresponding to $L_{org}$ and a fifth coefficient reorganized matrix $S_{R,org}^5$ corresponding to $R_{org}$, respectively embedding the third digital watermarking information into a sixth coefficient reorganized matrix $S_{org}^6$ corresponding to $L_{org}$ and a sixth coefficient reorganized matrix $S_{R,org}^6$ corresponding to $R_{org}$, in such a manner that a stereo image with digital watermarking is obtained;

①-10 sending the stereo image with digital watermarking to a receiving terminal by the transmitting terminal;

②-1 at the receiving terminal, denoting a received distorted stereo image with digital watermarking for evaluating as $S_{dis}$, $S_{dis}$ is a distorted stereo image of $S_{org}$, denoting a left-view image of $S_{dis}$ as $L_{dis}$, denoting a right-view image of $S_{dis}$ as $R_{dis}$; dividing $L_{dis}$ and $R_{dis}$ respectively into $$\frac{M \times N}{8 \times 8}$$

image blocks which are non-overlapped with each other and have a size of 8×8, wherein M is a width of $L_{dis}$ and $R_{dis}$, N is a height of $L_{dis}$ and $R_{dis}$;

②-2 processing discrete cosine transform (DCT) on each image block in $L_{dis}$ and $R_{dis}$, so as to obtain a DCT coefficient matrix of each image block in $L_{dis}$ and $R_{dis}$;

②-3 processing coefficient reorganization on all DTC coefficients in the DCT coefficient matrix of all of the image blocks in $L_{dis}$ and $R_{dis}$, so as to obtain 10 coefficient reorganized matrixes which are different from each other and respectively corresponding to $L_{dis}$ and $R_{dis}$, denoting an n'th coefficient reorganized matrix corresponding to $L_{dis}$ as $S_{L,dis}{}^{n'}$, denoting an n'th coefficient reorganized matrix corresponding to $R_{dis}$ as $S_{R,dis}{}^{n'}$, wherein DCT coefficients having a same coordinate position in the DCT coefficient matrixes of all the image blocks in $L_{dis}$ are located in a same coefficient reorganized matrix, and DCT coefficients having a same coordinate position in the DCT coefficient matrixes of all the image blocks in $R_{dis}$ are located in a same coefficient reorganized matrix, wherein $1 \le n' \le 10$;

②-4 calculating an absolute value matrix of a difference value of each coefficient reorganized matrix corresponding to $L_{dis}$ and each coefficient reorganized matrix corresponding to $R_{dis}$, denoting an absolute value matrix of a difference value of an n' th coefficient reorganized matrix $S_{L,dis}{}^{n'}$ corresponding to $L_{dis}$ and an n' th coefficient reorganized matrix $S_{R,dis}{}^{n'}$ corresponding to $R_{dis}$ as $D_{dis}{}^{n'}$ denoting an lth DCT coefficient of $D_{dis}{}^{n'}$ as $D_{dis}{}^{n'}(l)$, wherein $D_{dis}{}^{n'}(l)=|S_{L,dis}{}^{n'}(l)-S_{R,dis}{}^{n'}(l)|$;

calculating an average value and a standard deviation of the absolute value matrix of the difference value of each coefficient reorganized matrix corresponding to $L_{dis}$ and each coefficient reorganized matrix corresponding to $R_{dis}$, respectively denoting the average value and the standard deviation of $D_{dis}^{n'}$ as $\mu_d^{n'}$ and $\sigma_d^{n'}$, wherein $$\mu_d^{n'} = \frac{1}{L_{n'}} \sum_{l=1}^{L_{n'}} D_{dis}^{n'}(l),$$

$$\sigma_d^{n'} = \sqrt{\frac{1}{L_{n'}-1} \sum_{l=1}^{L_{n'}} (D_{dis}^{n'}(l) - \mu_d^{n'})^2} \ ;$$

wherein $S_{L,dis}^{n'}(l)$ represents an lth DCT coefficient in $S_{L,dis}^{n'}$, $S_{R,dis}^{n'}(l)$ represents an lth DCT coefficient in $S_{R,dis}^{n'}$, wherein "| |" is an absolute value sign, $1 \le l \le L_{n'}$, wherein $L_{n'}$ represents a total number of DCT coefficients in $S_{L,dis}^{n'}$ or $S_{R,dis}^{n'}$;

②-5 respectively processing filtering on all of the DCT coefficients in the DCT coefficient matrix of each image block in $L_{dis}$ and $R_{dis}$ utilizing Watson sensitivity operator, so as to obtain a filtered DCT coefficient matrix of each image block in $L_{dis}$ and $R_{dis}$;

②-6 respectively processing coefficient reorganization on the DCT coefficients of the filtered DCT coefficient matrix of all the image blocks in $L_{dis}$ and $R_{dis}$ utilizing the same way of coefficient reorganization as thereof in the step ②-3, so as to obtain 10 filtered coefficient reorganized matrixes which are respectively corresponding to $L_{dis}$ and $R_{dis}$, and different from each other, denoting an n'th filtered coefficient reorganized matrix corresponding to $L_{dis}$ as $\overline{S}_{L,dis}^{n'}$, denoting an n'th filtered coefficient reorganized matrix corresponding to $R_{dis}$ as $\overline{S}_{R,dis}^{n'}$, wherein filtered DCT coefficients having a same coordinate position in the filtered DCT coefficient matrixes of all the image blocks in $L_{dis}$ are located in a same filtered coefficient reorganized matrix, and filtered DCT coefficients having a same coordinate position in the filtered DCT coefficient matrixes of all the image blocks in $R_{dis}$ are located in a same filtered coefficient reorganized matrix, wherein $1 \le n' \le 10$;

②-7 according to all of the filtered DCT coefficients in the 10 filtered coefficient reorganized matrixes respectively corresponding to $L_{dis}$ and $R_{dis}$, calculating a second sensitivity threshold, which is denoted as T2, wherein $$T2 = \alpha \times \sum_{k=1}^{10} \sum_{l=1}^{L_k} |\overline{S}_{dis}^k(l)| / \sum_{k=1}^{10} L_k,$$

wherein $\alpha$ is a sensitivity threshold regulatory factor, $1 \le k \le 10$, $1 \le l \le L_k$, wherein $L_k$ represents a total number of filtered DCT coefficients of a kth filtered coefficient reorganized matrix in the 10 filtered coefficient reorganized matrixes respectively corresponding to $L_{dis}$ or $R_{dis}$, wherein $\overline{S}_{dis}^k(l)$ represents an lth filtered DCT coefficient of a kth filtered coefficient reorganized matrix in the 10 filtered coefficient reorganized matrixes respectively corresponding to $L_{dis}$ or $R_{dis}$, wherein "| |" is an absolute value sign;

②-8 selecting filtered DCT coefficients in each filtered coefficient reorganized matrix respectively corresponding to $L_{dis}$ and $R_{dis}$ which are greater than the second sensitivity threshold T2 to be determined as visual sensitivity coefficients, calculating proportions of visual sensitivity coefficients in each filtered coefficient reorganized matrix respectively corresponding to $L_{dis}$ and $R_{dis}$, denoting a proportion of visual sensitivity coefficients in an n'th filtered coefficient reorganized matrix $\overline{S}_{L,dis}^{n'}$ corresponding to $L_{dis}$ as $P_d^L(n')$, wherein $P_d^L(n') = D_T^L(n')/D^L(n')$, denoting a proportion of visual sensitivity coefficients in an n'th filtered coefficient reorganized matrix $\overline{S}_{R,dis}^{n'}$ corresponding to $R_{dis}$ as $P_d^R(n')$, wherein $P_d^R(n') = D_T^R(n')/D^R(n')$, wherein $D_T^L(n')$ represents a number of visual sensitivity coefficients in the n'th filtered coefficient reorganized matrix $\overline{S}_{L,dis}^{n'}$ corresponding to $L_{dis}$, $D^L(n')$ represents a total number of filtered DCT coefficients in the n'th filtered coefficient reorganized matrix $\overline{S}_{L,dis}^{n'}$ corresponding to $L_{dis}$, $D_T^R(n')$ represents a number of visual sensitivity coefficients in the n'th filtered coefficient reorganized matrix $\overline{S}_{R,dis}^{n'}$ corresponding to $R_{dis}$, and $D^R(n')$ represents a total number of filtered DCT coefficients in the n'th filtered coefficient reorganized matrix $\overline{S}_{R,dis}^{n'}$ corresponding to $R_{dis}$;

②-9 detecting a first digital watermarking information embedded in $S_{dis}$, processing decoding and inverse quantization on the detected first digital watermarking information, so as to obtain an average value and a standard deviation of the absolute value matrix of the difference value of each coefficient reorganized matrix corresponding to $L_{org}$ and each coefficient reorganized matrix corresponding to $R_{org}$ embedded at the transmitting terminal, processing texture similarity measurement on $S_{dis}$ utilizing Canberra distance, so as to obtain a stereo perception value of $S_{dis}$, which is denoted as $Q_{disp}$, wherein $$Q_{disp} = \frac{\sum_{n'=1}^{10} w_{n'}(|\mu_r^{n'} - \mu_d^{n'}| + |\sigma_r^{n'} - \sigma_d^{n'}|)}{\sum_{n'=1}^{10} w_{n'}(\mu_r^{n'} + \mu_d^{n'} + \sigma_r^{n'} + \sigma_d^{n'})},$$

wherein, $\mu_r^{n'}$ and $\sigma_r^{n'}$ respectively represent a average value and a standard deviation of absolute value matrix of the difference value of an n'th coefficient reorganized matrix $S_{L,org}^{n'}$ corresponding to $L_{org}$ and an n'th coefficient reorganized matrix $S_{R,org}^{n'}$ corresponding to $R_{org}$ embedded at the transmitting terminal, wherein $w_{n'}$ represents a weight, $$w_{n'} = \begin{cases} 1, & \text{if } n' = 1 \\ 0.5 & \text{if } n' = 2 \text{ or } n' = 3 \text{ or } n' = 4 \\ 0.25, & \text{if } n' = 5 \text{ or } n' = 6 \text{ or } n' = 7 \\ 0.125, & \text{if } n' = 8 \text{ or } n' = 9 \text{ or } n' = 10 \end{cases},$$

"| |" is an absolute value sign;

detecting a second digital watermarking information embedded in $S_{dis}$, processing decoding and inverse quantization on the detected second digital watermarking information, so as to obtain a proportion of visual sensitivity coefficients in each filtered coefficient reorganized matrix corresponding to $L_{org}$ embedded at the transmitting terminal, then calculating a left-view quality value, which is denoted as $Q_{view}^L$, wherein $$Q_{view}^L = \frac{1}{1 + \log_2\left(\frac{K_L}{Q_0} + 1\right)},$$

wherein $Q_0$ is a dynamic adjustor, $$K_L = \sum_{n'=1}^{10} |P_r^L(n') - P_d^L(n')|,$$

wherein $P_r^L(n')$ represents a proportion of visual sensitivity coefficients in an n'th filtered coefficient reorganized matrix $\overline{S}_{L,org}^{n'}$ corresponding to $L_{org}$ embedded at the transmitting terminal, "||" is an absolute value sign;

detecting a third digital watermarking information embedded in $S_{dis}$, then processing decoding and inverse quantization on the third digital watermarking information detected, so as to obtain a proportion of visual sensitivity coefficients in each filtered coefficient reorganized matrix corresponding to $R_{org}$ embedded at the transmitting terminal, then calculating a right-view quality value, which is denoted as $Q_{view}^R$, $$Q_{view}^R = \frac{1}{1 + \log_2\left(\frac{K_R}{Q_0} + 1\right)},$$

wherein $$K_R = \sum_{n'=1}^{10} |P_r^R(n') - P_d^R(n')|, P_r^R(n')$$

represents a proportion of visual sensitivity coefficients in an n'th filtered coefficient reorganized matrix $\overline{S}_{R,org}^{n'}$ corresponding to $R_{org}$ embedded at the transmitting terminal;

②-10 calculating a view quality value of $S_{dis}$ according to $Q_{view}^L$, and $Q_{view}^R$, which is denoted as $Q_{view}$, wherein $Q_{view} = (Q_{view}^L + Q_{view}^R)/2$;

②-11 calculating an objective quality score of the distorted stereo image $S_{dis}$ utilizing a support vector regression model with an optimal weight vector $W^{opt}$ and an optimal bias $b^{opt}$, denoting the objective quality score of the distorted stereo image $S_{dis}$ as $Q_{obj}$, $Q_{obj} = (W^{opt})^T \phi(x) + b^{opt}$, wherein $x = [Q_{disp}, Q_{view}]$, x represents a vector constituted by the stereo perception value and the view quality value of the distorted stereo image $S_{dis}$, $(W^{opt})^T$ is a transposed vector of $W^{opt}$, $\phi(x)$ is a linear function of x.

In the step ①-3 a specific process for processing coefficient reorganization on all DCT coefficients in the DCT coefficient matrix of all of the image blocks in $L_{org}$ and $R_{org}$, and in the step ②-3 a specific process for processing coefficient reorganization on all DTC coefficients in the DCT coefficient matrix of all of the image blocks in $L_{dis}$ and $R_{dis}$ comprises following steps of:

denoting $L_{org}$ or $R_{org}$ or $L_{dis}$ or $R_{dis}$ which is processed as an image for processing, extracting a DCT coefficient having a coordinate position (1,1) in the DCT coefficient matrix of all the image blocks in the image for processing, so as to form a first coefficient reorganized matrix in sequence;

extracting a DCT coefficient having a coordinate position (1,2) in the DCT coefficient matrix of all the image blocks in the image for processing, so as to form a second coefficient reorganized matrix in sequence;

extracting a DCT coefficient having a coordinate position (2,1) in the DCT coefficient matrix of all the image blocks in the image for processing, so as to form a third coefficient reorganized matrix in sequence;

extracting a DCT coefficient having a coordinate position (2,2) in the DCT coefficient matrix of all the image blocks in the image for processing, so as to form a fourth coefficient reorganized matrix in sequence;

extracting all DCT coefficients having an abscissa $1 \leq i \leq 2$ and an ordinate $3 \leq j \leq 4$ in the DCT coefficient matrix of all image blocks in the image for processing, so as to form a fifth coefficient reorganized matrix in sequence;

extracting all DCT coefficients having an abscissa $3 \leq i \leq 4$ and an ordinate $1 \leq j \leq 2$ in the DCT coefficient matrix of all image blocks in the image for processing, so as to form a sixth coefficient reorganized matrix in sequence;

extracting all DCT coefficients having an abscissa $3 \leq i \leq 4$ and an ordinate $3 \leq j \leq 4$ in the DCT coefficient matrix of all image blocks in the image for processing, so as to form a seventh coefficient reorganized matrix in sequence;

extracting all DCT coefficients having an abscissa $1 \leq i \leq 4$ and an ordinate $5 \leq j \leq 8$ in the DCT coefficient matrix of all image blocks in the image for processing, so as to form an eighth coefficient reorganized matrix in sequence;

extracting all DCT coefficients having an abscissa $5 \leq i \leq 8$ and an ordinate $1 \leq j \leq 4$ in the DCT coefficient matrix of all image blocks in the image for processing, so as to form a ninth coefficient reorganized matrix in sequence; and extracting all DCT coefficients having an abscissa $5 \leq i \leq 8$ and an ordinate $5 \leq j \leq 8$ in the DCT coefficient matrix of all image blocks in the image for processing, so as to form a tenth coefficient reorganized matrix in sequence.

In the step ①-6, $L_{org}$ and $R_{org}$ respectively serve as images for processing, a specific process for coefficient reorganization on all filtered DCT coefficients in the filtered DCT coefficient matrix of all the image blocks in the image for processing is the same as the specific process in the step ①-3 for coefficient reorganization on all the DTC coefficients in the DCT coefficient matrix of all the image blocks of the image for processing;

wherein in the step ②-6, $L_{dis}$ and $R_{dis}$ respectively serve as images for processing, a specific process for coefficient reorganization on all filtered DCT coefficients in the filtered DCT coefficient matrix of all the image blocks in the image for processing is the same as the specific process in the step ②-3 for coefficient reorganization on all the DTC coefficients in the DCT coefficient matrix of all the image blocks of the image for processing.

In the step ①-7 and the step ②-7, $\alpha = 3$.

In the step ②-9, $Q_0 = 0.1$.

In the step ②-11, a specific process of setting up a support vector regression model with an optimal weight vector $W^{opt}$ and an optimal bias $b^{opt}$ for calculating an objective quality score of a distorted stereo image $S_{dis}$ comprises following steps of:

selecting n" original undistorted stereo images, wherein n">1, respectively processing the n" original undistorted stereo images with different types of distortion under different distortion degrees, utilizing the n" original undistorted stereo images and all of the corresponding distorted stereo images to form a training set of stereo images, respectively implementing subjective evaluation on each stereo image in the training set of stereo images to obtain a subjective quality score of each stereo image in the training set of stereo images, denoting the subjective quality score of a j th stereo image in the training set of the stereo images as $DMOS_j$, wherein DMOS is difference mean opinion score, $0 \leq DMOS_j \leq 100$;

according to the method of calculating $Q_{disp}$ and $Q_{view}$ in the step ①-1 to the step ②-10, calculating a stereo perception value and a view quality value of each stereo image in the training set of the stereo images, denoting the stereo perception value of a j th stereo image in the training set of the stereo images as $Q_{disp}(j)$, denoting the view quality value of a j th stereo image in the training set of the stereo images as $Q_{view}(j)$, utilizing the stereo perception value and the view quality value of a j th stereo image in the training set of the stereo images to constitute a vector x, which is a quality value of a j th stereo image in the training set of the stereo images, $x_j = [Q_{disp}(j), Q_{view}(j)]$, wherein $1 \leq j \leq N'$, N' represents a number of stereo images in the training set of the stereo images;

utilizing support vector regression to train the quality value and the subjective quality score of all the stereo images in the training set of the stereo images, in such a manner that an error between a regression function value and a subjective quality score is at a minimum value, fitting to obtain an optimal weight vector $W^{opt}$ and an optimal bias $b^{opt}$, and setting up a support vector regression model utilizing $W^{opt}$ and $b^{opt}$.

Compared with the prior arts, advantages of the present invention lie in following aspects. At the transmitting terminal, characteristics of left-view image and right-view image of the original undistorted stereo image in DCT domain are extracted, which includes: the average value and the standard deviation of the absolute value matrix of the difference value between each coefficient reorganized matrix corresponding to the left-view image of the original undistorted stereo image and each coefficient reorganized matrix corresponding to the right-view image thereof; the proportion of the visual sensitivity coefficients in each filtered coefficient reorganized matrix respectively corresponding to the left-view image of the original undistorted stereo image; and the proportion of the visual sensitivity coefficients in each filtered coefficient reorganized matrix respectively corresponding to the right-view image of the original undistorted stereo image. Furthermore, each characteristic is processed with quantization coding, so as to obtain the digital watermarking information. Since CRC error checking and correcting and BCH error correction coding are adopted during the process of coding, the robustness of the digital watermarking is effectively enhanced. Then the digital watermarking information is embedded into the DCT domain of the left-view image and the right-view image of the original undistorted stereo image utilizing the dither modulation digital watermarking embedding method based on Watson sensitivity operator and JPEG quantization table. Since the dither modulation digital watermarking embedding method is utilized for embedding digital watermarking information, the transparency and robustness of the embedded digital watermarking is improved. At the receiving terminal, characteristics of the left-view image and the right-view image of the distorted stereo image in DCT domain are extracted, which includes: the average value and the standard deviation of the absolute value matrix of the difference value between each coefficient reorganized matrix corresponding to the left-view image of the distorted stereo image and each coefficient reorganized matrix corresponding to the right-view image thereof; the proportion of the visual sensitivity coefficients in each filtered coefficient reorganized matrix respectively corresponding to the left-view image of the distorted stereo image; and the proportion of the visual sensitivity coefficients in each filtered coefficient reorganized matrix respectively corresponding to the right-view image of the distorted stereo image. Then the digital watermarking information embedded in the distorted stereo image is extracted and detected, and then processed with decoding and inverse quantization. The stereo perception value and the view quality value of the distorted stereo image are obtained by comparing the characteristic of the left-view image and the right-view image of the distorted stereo image and characteristic of the left-view image and the right-view image of the original undistorted stereo image in DCT domain. And finally, the objective quality score of the distorted stereo image is obtained utilizing a support vector regression model obtained by training. In the present invention, characteristics of an original undistorted stereo image are embedded in the stereo image itself, and transmitted along with the stereo image, thus the method is capable of overcoming limitation that the reduced-reference model needs to transmit the characteristics of the original undistorted image with an auxiliary channel. Moreover, the present invention can well predict human eye's subjective perception on stereo image, and thus is in accord with visual characteristics of human eyes.

These and other objectives, features, and advantages of the present invention will become apparent from the following detailed description, the accompanying drawings, and the appended claims.

DETAILED DESCRIPTION OF THE PREFERRED EMBODIMENT

Combined with the accompanying drawings and preferred embodiments, further description of the present invention is illustrated as follows.

Figure 1:
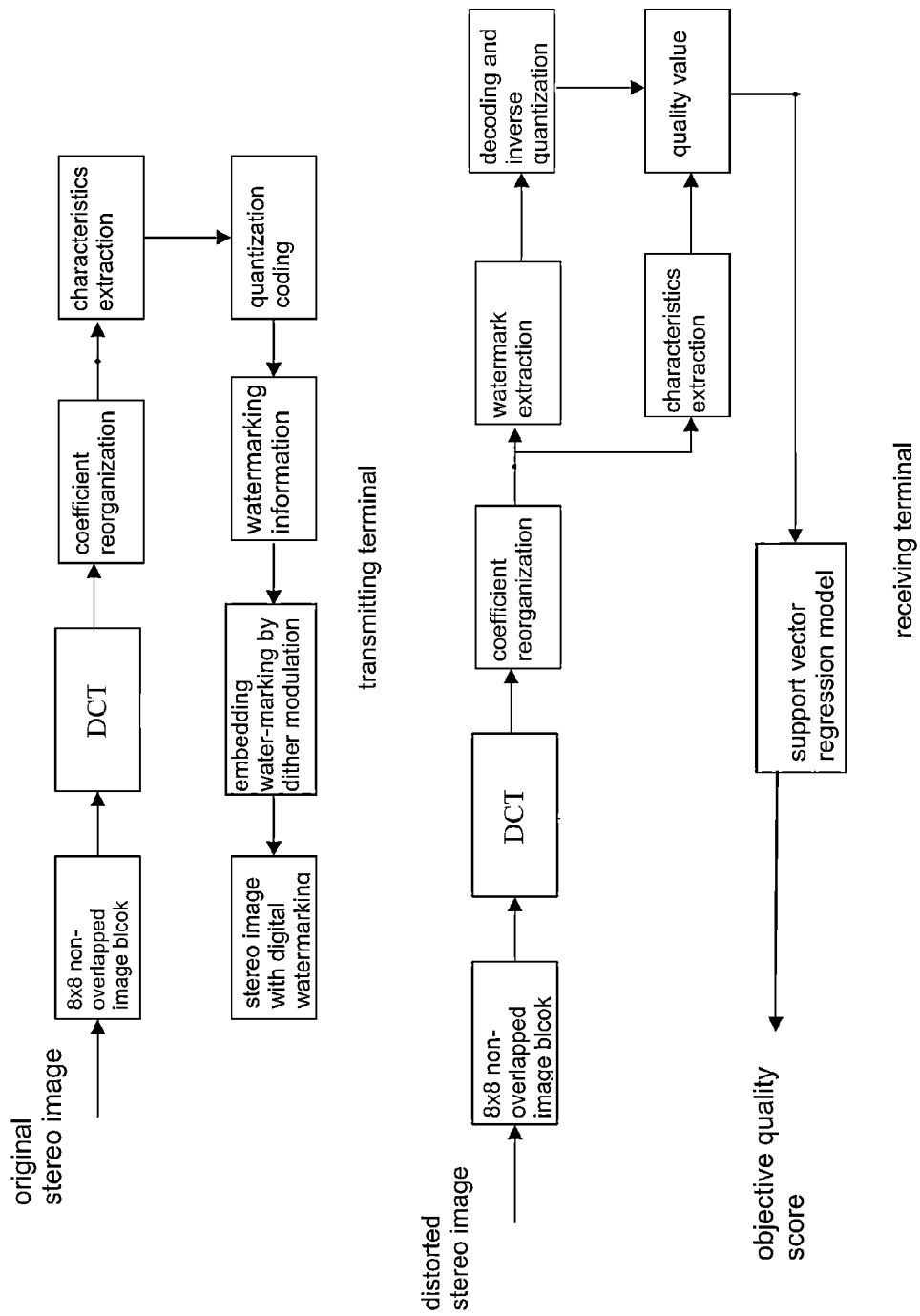
FIG. 1 is an overall block diagram of a digital watermarking based method for objectively evaluating quality of a stereo image according to a preferred embodiment of the present invention.
Figure 2A:
FIG. 2a is a stereo image of Akko&Kayo (640×480).
Figure 2B:
FIG. 2b is a stereo image of Altmoabit (1024×768).
Figure 2C:
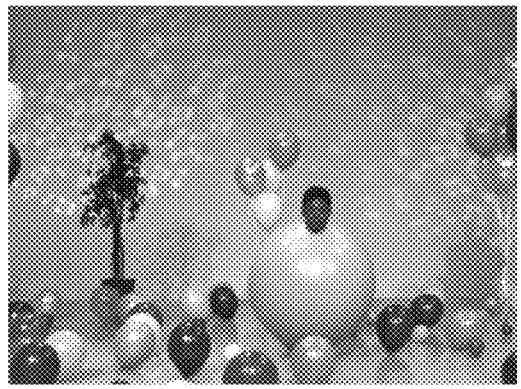
FIG. 2c is a stereo image of Balloons (1024×768).
Figure 2D:
FIG. 2d is a stereo image of Doorflowers (1024×768).
Figure 2E:
FIG. 2e is a stereo image of Kendo (1024×768).
Figure 2F:
FIG. 2f is a stereo image of LeaveLaptop (1024×768).
Figure 2G:
FIG. 2g is a stereo image of Lovebird1 (1024×768).
Figure 2H:
FIG. 2h is a stereo image of Newspaper (1024×768).
Figure 2I:
FIG. 2i is a stereo image of Xmas (640×480).
Figure 2J:
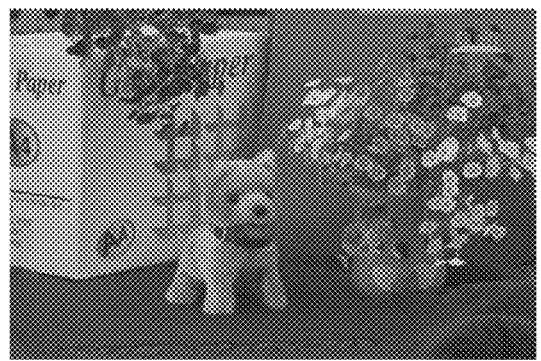
FIG. 2j is a stereo image of Puppy (720×480).
Figure 2K:
FIG. 2k is a stereo image of Soccer2 (720×480).
Figure 2L:
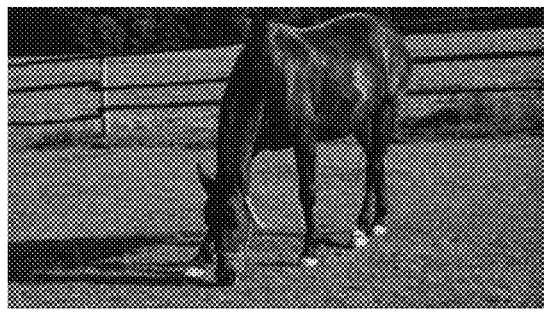
FIG. 2l is a stereo image of Horse (480×270).

The present invention provides a digital watermarking based method for objectively evaluating quality of stereo image, which has an overall block diagram as shown in FIG. 1 of the drawings and specifically comprises steps as follows.

①-1 At a transmitting terminal, denoting an original undistorted stereo image as $S_{org}$, denoting a left-view image of $S_{org}$ as $L_{org}$ and a right-view image of $S_{org}$ as $R_{org}$; dividing $L_{org}$ and $R_{org}$ respectively into $$\frac{M \times N}{8 \times 8}$$

image blocks which are non-overlapped with each other and have a size of 8×8, wherein M is a width of $L_{org}$ or $R_{org}$, N is a height of $L_{org}$ or $R_{org}$.

①-2 Processing discrete cosine transform (DCT, Discrete Cosine Transform) on each image block, so as to obtain a DCT coefficient matrix of each image block which is non non-overlapped with each other and has a size of 8×8 in $L_{org}$ and $R_{org}$, denoting a DCT coefficient having a coordinate position of (i,j) in the DCT coefficient matrix of an image block having a coordinate position of (m,n) in $L_{org}$ as $K_{L,org}$ [i,j,m,n], denoting a DCT coefficient having a coordinate position of (i,j) in the DCT coefficient matrix of an image block having a coordinate position of (m, n) in $R_{org}$ as $K_{R,org}$ [i,j,m,n], wherein $$1 \leq m \leq \frac{M}{8}, 1 \leq n \leq \frac{N}{8}, 1 \leq i \leq 8, 1 \leq j \leq 8.$$

①-3 Processing coefficient reorganization on all DTC coefficients in the DCT coefficient matrix of all of the image blocks in $L_{org}$ and $R_{org}$, so as to obtain 10 coefficient reorganized matrixes which are different from each other and respectively corresponding to $L_{org}$ and $R_{org}$.

Denoting an n'th coefficient reorganized matrix corresponding to $L_{org}$ as $S_{L,org}{}^{n'}$, denoting an n'th coefficient reorganized matrix corresponding to $R_{org}$ as $S_{R,org}{}^{n'}$, wherein DCT coefficients having a same coordinate position in the DCT coefficient matrixes of all the image blocks in $L_{org}$ are located in a same coefficient reorganized matrix, and DCT coefficients having a same coordinate position in the DCT coefficient matrixes of all the image blocks in $R_{org}$ are located in a same coefficient reorganized matrix, wherein $1 \leq n \leq 10$.

①-4 Calculating an absolute value matrix of a difference value of each coefficient reorganized matrix corresponding to $L_{org}$ and each coefficient reorganized matrix corresponding to $R_{org}$, denoting an absolute value matrix of a difference value of an n' th coefficient reorganized matrix $S_{L,org}{}^{n'}$ corresponding to $L_{org}$ and an n' th coefficient reorganized matrix $S_{R,org}{}^{n'}$ corresponding to $R_{org}$ as $D_{org}{}^{n'}$, denoting an l th coefficient of $D_{org}{}^{n'}$ as $D_{org}{}^{n'}(l)$, wherein $D_{org}{}^{n'}(l) = |S_{L,org}{}^{n'}(l) - S_{R,org}{}^{n'}(l)|$.

Calculating an average value and a standard deviation of the absolute value matrix of the difference value of each coefficient reorganized matrix corresponding to $L_{org}$ and each coefficient reorganized matrix corresponding to $R_{org}$, respectively denoting the average value and the standard deviation of $D_{org}{}^{n'}$ as $\mu_r^{n'}$ and $\sigma_r^{n'}$, wherein $$\mu_r^{n'} = \frac{1}{L_{n'}} \sum_{l=1}^{L_{n'}} D_{org}^{n'}(l), \quad \sigma_r^{n'} = \sqrt{\frac{1}{L_{n'}-1} \sum_{l=1}^{L_{n'}} (D_{org}^{n'}(l) - \mu_r^{n'})^2};$$

wherein $S_{L,org}{}^{n'}(l)$ represents an l th DCT coefficient in $S_{L,org}{}^{n'}$, $S_{R,org}{}^{n'}(l)$ represents an l th DCT coefficient in $S_{R,org}{}^{n'}$, wherein "||" is an absolute value sign, $1 \leq l \leq L_{n'}$, wherein $L_{n'}$ represents a total number of DCT coefficients in $S_{L,org}{}^{n'}$ or $S_{R,org}{}^{n'}$.

①-5 Respectively processing filtering on all of the DCT coefficients in the DCT coefficient matrix of each image block in $L_{org}$ and $R_{org}$ utilizing conventional Watson sensitivity operator, so as to obtain a filtered DCT coefficient matrix of each image block in $L_{org}$ and $R_{org}$, denoting a filtered DCT coefficient having a coordinate position of (i,j) in the filtered DCT coefficient matrix of an image block having a coordinate position of (m,n) in $L_{org}$ as $K'_{L,org}[i,j,m,n]$, and denoting a filtered DCT coefficient having a coordinate position of (i,j) in the filtered DCT coefficient matrix of an image block having a coordinate position of (m,n) in $R_{org}$ as $K'_{R,org}[i,j,m,n]$, wherein $$1 \leq m \leq \frac{M}{8}, 1 \leq n \leq \frac{N}{8}, 1 \leq i \leq 8, 1 \leq j \leq 8.$$

Here, all frequency sensitivities in the conventional Watson sensitivity operator are as shown in Table 1. Each element in Table 1 represents different sensitivities of each DCT coefficient in the DCT coefficient matrix of each image block which is non-overlapped with each other and has a size of 8×8 by human eyes under the condition without any noise masking, the smaller the value is, the more sensitive is the humans eyes on the frequency. Denoting a value having a coordinate position (i,j) in the Watson sensitivity operator as $t_{Waston}(i,j)$, then the filtering process is denoted by $K'_{L,org}[i,j,m,n] = t_{Waston}(i,j) \times K_{L,org}[i,j,m,n]$, $K_{R,org}[i,j,m,n] = t_{Waston}(i,j) \times K_{R,org}[i,j,m,n]$.

TABLE 1

Sensitivity at each frequency in Watson sensitivity operator

| Rows | Columns | | | | | | | |
|---|---|---|---|---|---|---|---|---|
| | 1 | 2 | 3 | 4 | 5 | 6 | 7 | 8 |
| 1 | 1.40 | 1.01 | 1.16 | 1.66 | 2.40 | 3.43 | 4.79 | 6.56 |
| 2 | 1.01 | 1.45 | 1.32 | 1.52 | 2.00 | 2.71 | 3.67 | 4.93 |
| 3 | 1.16 | 1.32 | 2.24 | 2.59 | 2.98 | 3.64 | 4.60 | 5.88 |
| 4 | 1.66 | 1.52 | 2.59 | 3.77 | 4.55 | 5.30 | 6.28 | 7.60 |
| 5 | 2.40 | 2.00 | 2.98 | 4.55 | 6.15 | 7.46 | 8.71 | 10.17 |
| 6 | 3.43 | 2.71 | 3.64 | 5.30 | 7.46 | 9.62 | 11.58 | 13.51 |
| 7 | 4.79 | 3.67 | 4.60 | 6.28 | 8.71 | 11.58 | 14.50 | 17.29 |
| 8 | 6.56 | 4.93 | 5.88 | 7.60 | 10.17 | 16.51 | 17.29 | 21.15 |

①-6 Respectively processing coefficient reorganization on the DCT coefficients of the filtered DCT coefficient matrix of all the image blocks in $L_{org}$ and $R_{org}$ utilizing the same way of coefficient reorganization as thereof in the step ①-3, so as to obtain 10 filtered coefficient reorganized matrixes which are respectively corresponding to $L_{org}$ and $R_{org}$, and different from each other, denoting an n'th filtered coefficient reorganized matrix corresponding to $L_{org}$ as $\overline{S}_{L,org}{}^{n'}$, denoting an n'th filtered coefficient reorganized matrix corresponding to $R_{org}$ as $\overline{S}_{R,org}{}^{n'}$, wherein filtered DCT coefficients having a same coordinate position in the filtered DCT coefficient matrixes of all the image blocks in $L_{org}$ are located in a same filtered coefficient reorganized matrix, and filtered DCT coefficients having a same coordinate position in the filtered DCT coefficient matrixes of all the image blocks in $R_{org}$ are located in a same filtered coefficient reorganized matrix, wherein $1 \leq n' \leq 10$.

①-7 According to all of the filtered DCT coefficients in the 10 filtered coefficient reorganized matrixes respectively corresponding to $L_{org}$ and $R_{org}$, calculating a first sensitivity threshold, which is denoted as T1, wherein $$T1 = \alpha \times \sum_{k=1}^{10} \sum_{l=1}^{L_k} |\overline{S}_{org}^k(l)| \Big/ \sum_{k=1}^{10} L_k,$$

wherein α is a sensitivity threshold regulatory factor, and in this specific embodiment $\alpha=3$, $1 \leq k \leq 10$, $1 \leq l \leq L_k$, wherein $L_k$ represents a total number of filtered DCT coefficients of a k th filtered coefficient reorganized matrix in the 10 filtered coefficient reorganized matrixes respectively corresponding to $L_{org}$ or $R_{org}$, wherein $\overline{S}_{org}^k(l)$ represents an l th filtered DCT coefficient of a k th filtered coefficient reorganized matrix in the 10 filtered coefficient reorganized matrixes, wherein "||" is an absolute value sign.

①-8 Selecting filtered DCT coefficients in each filtered coefficient reorganized matrix respectively corresponding to $L_{org}$ and $R_{org}$ which are greater than the first sensitivity threshold T1 to be determined as visual sensitivity coefficients, wherein if a filtered DCT coefficient in $\overline{S}_{L,org}{}^{n'}$ is greater than the first sensitivity threshold T1, the filtered DCT coefficient is determined as the visual sensitivity coefficient, then calculating proportions of visual sensitivity coefficients in each filtered coefficient reorganized matrix respectively corresponding to $L_{org}$ and $R_{org}$, denoting a proportion of visual sensitivity coefficients in an n'th filtered coefficient reorganized matrix $\overline{S}_{L,org}{}^{n'}$ corresponding to $L_{org}$ as $P_r^L(n')$, wherein $P_r^L(n')=R_T^L(n')/R^L(n')$, denoting a proportion of visual sensitivity coefficients in an n'th filtered coefficient reorganized matrix $\overline{S}_{R,org}{}^{n'}$ corresponding to $R_{org}$ as $P_r^R(n')$, wherein $P_r^R(n')=R_T^R(n')/R^R(n')$, wherein $R_T^L(n')$ represents a number of visual sensitivity coefficients in the n'th filtered coefficient reorganized matrix $\overline{S}_{L,org}{}^{n'}$ corresponding to $L_{org}$, $R^L(n')$ represents a total number of filtered DCT coefficients in the n'th filtered coefficient reorganized matrix $\overline{S}_{L,org}{}^{n'}$ corresponding to $L_{org}$, $R_T^R(n')$ represents a number of visual sensitivity coefficients in the n'th filtered coefficient reorganized matrix $\overline{S}_{R,org}{}^{n'}$ corresponding to $R_{org}$, and $R^R(n')$ represents a total number of filtered DCT coefficients in the n'th filtered coefficient reorganized matrix $\overline{S}_{R,org}{}^{n'}$ corresponding to $R_{org}$.

①-9 Processing quantization coding on the average value and the standard deviation of the absolute value matrix of the difference value of each coefficient reorganized matrix corresponding to $L_{org}$ and each coefficient reorganized matrix corresponding to $R_{org}$ for serving as a first digital watermarking information;

processing quantization coding on a proportion of the visual sensitivity coefficients in each filtered coefficient reorganized matrix corresponding to $L_{org}$ for serving as a second digital watermarking information;

processing quantization coding on a proportion of the visual sensitivity coefficients in each filtered coefficient reorganized matrix corresponding to $R_{org}$ for serving as a third digital watermarking information; and utilizing a dither modulation digital watermarking embedding method, respectively embedding the first digital watermarking information into a fourth coefficient reorganized matrix $S_{L,org}^4$ corresponding to $L_{org}$ and a fourth coefficient reorganized matrix $S_{R,org}^4$ corresponding to $R_{org}$, respectively embedding the second digital watermarking information into a fifth coefficient reorganized matrix $S_{L,org}^5$ corresponding to $L_{org}$ and a fifth coefficient reorganized matrix $S_{R,org}^5$ corresponding to $R_{org}$, respectively embedding the third digital watermarking information into a sixth coefficient reorganized matrix $S_{L,org}^6$ corresponding to $L_{org}$ and a sixth coefficient reorganized matrix $S_{R,org}^6$ corresponding to $R_{org}$, in such a manner that a stereo image with digital watermarking is obtained.

Here, the process of quantization coding is as follows. Respectively expressing $\mu_r^{n'}$, $\sigma_r^{n'}$, $P_r^L(n')$ and $P_r^R(n')$ as 8-bit binary digit, forming 16-bit CRC error checking and correcting code by the binary digits utilizing polynomial; further coding data containing the error checking and correcting code by utilizing (15, 5, 7) BCH which is capable of correcting error≤3 bit, so as to obtain ultimate coded data, wherein the ultimate coded data serves as watermarking information.

Here, a specific process for embedding the watermarking is as follows. Let $x_w$ represent watermarking embedded data. Embedding process of the watermarking is expressed by the following expression: $x_w=Q_\Delta{}^w(x)=\text{round}[(x+d(w))/\Delta]\times\Delta-d(w)$, wherein round [ ] is a round-off integral function, x represents data of initial carriers, $\Delta$ represents a quantization step, w represents watermarking information, d(w) is image-motion corresponding to w, $Q_\Delta{}^w()$ is a quantizer corresponding to w, wherein for a binary watermarking, there are two kinds of quantizers: quantizer 1 ($Q_\Delta^1()$) and quantizer 0 $Q_\Delta^0()$; wherein when the watermarking information is extracted utilizing a minimum distance decoder, if data received thereof is most closely to data obtained by the quantizer 1, the decoder determines the watermarking information embedded is 1, otherwise, the decoder determines the watermarking information embedded is 0, i.e., $$\hat{w} = \arg \min_{l' \in \{0,1\}}(y - y[l'])^2,$$

wherein y represents data received by the decoder, $\hat{w}$ represents watermarking information extracted, y[1] and y[0] respectively represents a quantized value obtained by processing dither modulation on the data y received utilizing the quantizer 1 and the quantizer 0.

In the present invention, transparency of the watermarking can be improved utilizing sensitivity at each frequency in Watson sensitivity operator. Combined with JPEG quantization table, robustness of the watermarking can be improved. Table 2 is a JPEG suggested quantization table. Since the Watson sensitivity operator and the JPEG suggested quantization table are constant, requirements for full-blind detection can be achieved.

TABLE 2

| | JPEG suggested quantization table | | | | | | | |
|---|---|---|---|---|---|---|---|---|
| | Columns | | | | | | | |
| Rows | 1 | 2 | 3 | 4 | 5 | 6 | 7 | 8 |
| 1 | 16 | 11 | 10 | 16 | 24 | 40 | 51 | 61 |
| 2 | 12 | 12 | 14 | 19 | 26 | 58 | 60 | 55 |
| 3 | 14 | 13 | 16 | 24 | 40 | 57 | 69 | 56 |
| 4 | 14 | 17 | 22 | 29 | 51 | 87 | 80 | 62 |
| 5 | 18 | 22 | 37 | 56 | 68 | 109 | 103 | 77 |
| 6 | 24 | 35 | 55 | 64 | 81 | 104 | 113 | 92 |
| 7 | 49 | 64 | 78 | 87 | 103 | 121 | 120 | 101 |
| 8 | 72 | 92 | 95 | 98 | 112 | 100 | 103 | 99 |

In the present invention, a quantization step $\Delta$ of the quantizer is determined according to the Watson sensitivity operator and the JPEG quantization table. While determining the quantization step $\Delta$, a global constant G is required for adjusting watermarking strength, wherein the quantization step $\Delta$ is represented as $$\Delta = \frac{G \cdot t_{Waston}(j, j)}{t_{JPEG}(i, j)},$$

wherein a value of G is usually 2, $t_{Waston}(i,j)$ represents a value having a coordinate position (i,j) in the Watson sensitivity operator, $t_{JPEG}(i,j)$ represents a value having a coordinate position (i,j) in the JPEG quantization table, wherein $1 \leq i \leq 8$, $1 \leq j \leq 8$.

①-10 Sending the stereo image with digital watermarking to a receiving terminal by the transmitting terminal.

②-1 At the receiving terminal, denoting a received distorted stereo image with digital watermarking for evaluating as $S_{dis}$, $S_{dis}$, is a distorted stereo image of $S_{org}$, denoting a left-view image of $S_{dis}$ as $L_{dis}$, denoting a right-view image of $S_{dis}$ as $R_{dis}$; dividing $L_{dis}$ and $R_{dis}$ respectively into $$\frac{M \times N}{8 \times 8}$$

image blocks which are non-overlapped with each other and have a size of 8×8, wherein M is a width of $L_{dis}$ and $R_{dis}$, N is a height of $L_{dis}$ and $R_{dis}$.

②-2 Processing discrete cosine transform on each image block which is non-overlapped with each other and has a size of 8×8 in $L_{dis}$ and $R_{dis}$, so as to obtain a DCT coefficient matrix of each image block, denoting a DCT coefficient at a coordinate position (i,j) in the DCT coefficient matrix of an image block at a coordinate position (m,n) in $L_{dis}$ as $K_{L,dis}[i,j,m,n]$, denoting a DCT coefficient at a coordinate position (i,j) in the DCT coefficient matrix of an image block at a coordinate position (m,n) in $R_{dis}$ as $K_{R,dis}[i,j,m,n]$, wherein $$1 \le m \le \frac{M}{8}, 1 \le n \le \frac{N}{8}, 1 \le i \le 8, 1 \le j \le 8.$$

②-3 Processing coefficient reorganization on all DTC coefficients in the DCT coefficient matrix of all of the image blocks in $L_{dis}$ and $R_{dis}$, so as to obtain 10 coefficient reorganized matrixes which are different from each other and respectively corresponding to $L_{dis}$ and $R_{dis}$.

Denoting an n'th coefficient reorganized matrix corresponding to $L_{dis}$ as $S_{L,dis}{}^{n'}$, denoting an n'th coefficient reorganized matrix corresponding to $R_{dis}$ as $S_{R,dis}{}^{n'}$, wherein DCT coefficients having a same coordinate position in the DCT coefficient matrixes of all the image blocks in $L_{dis}$ are located in a same coefficient reorganized matrix, and DCT coefficients having a same coordinate position in the DCT coefficient matrixes of all the image blocks in $R_{dis}$ are located in a same coefficient reorganized matrix, wherein $1 \le n' \le 10$.

②-4 Calculating an absolute value matrix of a difference value of each coefficient reorganized matrix corresponding to $L_{dis}$ and each coefficient reorganized matrix corresponding to $R_{dis}$, denoting an absolute value matrix of a difference value of an n'th coefficient reorganized matrix $S_{L,dis}{}^{n'}$ corresponding to $L_{dis}$ and an n' th coefficient reorganized matrix $S_{R,dis}{}^{n'}$ corresponding to $R_{dis}$ as $D_{dis}{}^{n'}$, denoting an lth DCT coefficient of $D_{dis}{}^{n'}$ as $D_{dis}{}^{n'}(l)$, wherein $D_{dis}{}^{n'}(l) = |S_{L,dis}{}^{n'}(l) - S_{R,dis}{}^{n'}(l)|$.

Calculating an average value and a standard deviation of the absolute value matrix of the difference value of each coefficient reorganized matrix corresponding to $L_{dis}$ and each coefficient reorganized matrix corresponding to $R_{dis}$, respectively denoting the average value and the standard deviation of $D_{dis}{}^{n'}$ as $\mu_d{}^{n'}$ and $\sigma_d{}^{n'}$, wherein $$\mu_d^{n'} = \frac{1}{L_{n'}} \sum_{l=1}^{L_{n'}} D_{dis}^{n'}(l), \quad \sigma_d^{n'} = \sqrt{\frac{1}{L_{n'}-1} \sum_{l=1}^{L_{n'}} (D_{dis}^{n'}(l) - \mu_d^{n'})^2};$$

wherein $S_{L,dis}{}^{n'}(l)$ represents an lth DCT coefficient in $S_{L,dis}{}^{n'}$, $S_{R,dis}{}^{n'}(l)$ represents an lth DCT coefficient in $S_{R,dis}{}^{n'}$, wherein "||" is an absolute value sign, $1 \le l \le L_{n'}$, wherein $L_{n'}$ represents a total number of DCT coefficients in $S_{L,dis}{}^{n'}$ or $S_{R,dis}{}^{n'}$.

②-5 Respectively processing filtering on all of the DCT coefficients in the DCT coefficient matrix of each image block in $L_{dis}$ and $R_{dis}$ utilizing the conventional Watson sensitivity operator, so as to obtain a filtered DCT coefficient matrix of each image block in $L_{dis}$ and $R_{dis}$, denoting a filtered DCT coefficient at a coordinate position (i,j) in the filtered DCT coefficient matrix of an image block at a coordinate position (nm,n) in $L_{dis}$ as $K'_{L,dis}[i,j,m,n]$, denoting a filtered DCT coefficient at a coordinate position (i,j) in the filtered DCT coefficient matrix of an image block at a coordinate position (nm,n) in $R_{dis}$ as $K'_{R,dis}[i,j,m,n]$, wherein $$1 \le m \le \frac{M}{8}, 1 \le n \le \frac{N}{8}, 1 \le i \le 8, 1 \le j \le 8.$$

Similarly, denoting a value having a coordinate position (i,j) in the Watson sensitivity operator as $t_{Waston}(i,j)$, then the filtering process is denoted by $K'_{L,dis}[i,j,m,n] = t_{Waston}(i,j) \times K_{L,dis}[i,j,m,n]$, $K'_{R,dis}[i,j,m,n] = t_{Waston}(i,j) \times K_{R,dis}[i,j,m,n]$.

②-6 Respectively processing coefficient reorganization on the DCT coefficients of the filtered DCT coefficient matrix of all the image blocks in $L_{dis}$ and $R_{dis}$ utilizing the same way of coefficient reorganization as thereof in the step ②-3, so as to obtain 10 filtered coefficient reorganized matrixes which are respectively corresponding to $L_{dis}$ and $R_{dis}$, and different from each other, denoting an n'th filtered coefficient reorganized matrix corresponding to $L_{dis}$ as $\overline{S}_{L,dis}{}^{n'}$, denoting an n'th filtered coefficient reorganized matrix corresponding to $R_{dis}$ as $\overline{S}_{R,dis}{}^{n'}$, wherein filtered DCT coefficients having a same coordinate position in the filtered DCT coefficient matrixes of all the image blocks in $L_{dis}$ are located in a same filtered coefficient reorganized matrix, and filtered DCT coefficients having a same coordinate position in the filtered DCT coefficient matrixes of all the image blocks in $R_{dis}$ are located in a same filtered coefficient reorganized matrix, wherein $1 \le n \le 10$.

②-7 According to all of the filtered DCT coefficients in the 10 filtered coefficient reorganized matrixes respectively corresponding to $L_{dis}$ and $R_{dis}$, calculating a second sensitivity threshold, which is denoted as T2, wherein $$T2 = \alpha \times \sum_{k=1}^{10} \sum_{l=1}^{L_k} |\overline{S}_{dis}^k(l)| \bigg/ \sum_{k=1}^{10} L_k,$$

herein α is a sensitivity threshold regulatory factor, and in this specific embodiment α=3, $1 \le k \le 10$, $1 \le l \le L_k$, wherein $L_k$ represents a total number of filtered DCT coefficients of a k th filtered coefficient reorganized matrix in the 10 filtered coefficient reorganized matrixes respectively corresponding to $L_{dis}$ or $R_{dis}$, wherein $\overline{S}_{dis}^k(l)$ represents an l th filtered DCT coefficient of a k th filtered coefficient reorganized matrix in the 10 filtered coefficient reorganized matrixes respectively corresponding to $L_{dis}$ or $R_{dis}$, wherein "||" is an absolute value sign.

②-8 Selecting filtered DCT coefficients in each filtered coefficient reorganized matrix respectively corresponding to $L_{dis}$ and $R_{dis}$ which are greater than the second sensitivity threshold T2 to be determined as visual sensitivity coefficients, calculating proportions of visual sensitivity coefficients in each filtered coefficient reorganized matrix respectively corresponding to $L_{dis}$ and $R_{dis}$, denoting a proportion of visual sensitivity coefficients in an n' th filtered coefficient reorganized matrix $\overline{S}_{L,dis}{}^{n'}$ corresponding to $L_{dis}$ as $P_d^L(n')$, wherein $P_d^L(n')=D_T^L(n')/D^L(n')$, denoting a proportion of visual sensitivity coefficients in an n'th filtered coefficient reorganized matrix $\overline{S}_{R,dis}{}^{n'}$ corresponding to $R_{dis}$ as $P_d^R(n')$, wherein $P_d^R(n')=D_T^R(n')/D^R(n')$, wherein $D_T^L(n')$ represents a number of visual sensitivity coefficients in the n' th filtered coefficient reorganized matrix $\overline{S}_{L,dis}{}^{n'}$ corresponding to $L_{dis}$, $D^L(n')$ represents a total number of filtered DCT coefficients in the n'th filtered coefficient reorganized matrix $\overline{S}_{L,dis}{}^{n'}$ corresponding to $L_{dis}$, $D_T^R(n')$ represents a number of visual sensitivity coefficients in the n' th filtered coefficient reorganized matrix $\overline{S}_{R,dis}{}^{n'}$ corresponding to $R_{dis}$, and $D^R(n')$ represents a total number of filtered DCT coefficients in the n' th filtered coefficient reorganized matrix $\overline{S}_{R,dis}{}^{n'}$ corresponding to $R_{dis}$.

②-9 Detecting a first digital watermarking information embedded in $S_{dis}$, processing decoding and inverse quantization on the detected first digital watermarking information, so as to obtain an average value and a standard deviation of the absolute value matrix of the difference value of each coefficient reorganized matrix corresponding to $L_{org}$ and each coefficient reorganized matrix corresponding to $R_{org}$ embedded at the transmitting terminal in the step ①-9.

Processing texture similarity measurement on $S_{dis}$ utilizing Canberra distance, so as to obtain a stereo perception value of $S_{dis}$, which is denoted as $Q_{disp}$, wherein $$Q_{disp} = \frac{\sum_{n'=1}^{10} w_{n'}(|\mu_r^{n'} - \mu_d^{n'}| + |\sigma_r^{n'} - \sigma_d^{n'}|)}{\sum_{n'=1}^{10} w_{n'}(\mu_r^{n'} + \mu_d^{n'} + \sigma_r^{n'} + \sigma_d^{n'})},$$

wherein $\mu_r^{n'}$ and $\sigma_r^{n'}$ respectively represent a average value and a standard deviation of absolute value matrix of the difference value of an n' th coefficient reorganized matrix $S_{L,org}{}^{n'}$ corresponding to $L_{org}$ and an n' th coefficient reorganized matrix $S_{R,org}{}^{n'}$ corresponding to $R_{org}$ embedded at the transmitting terminal in the step ①-9, wherein $w_{n'}$ represents a weight, $$w_{n'} = \begin{cases} 1, & \text{if } n' = 1 \\ 0.5 & \text{if } n' = 2 \text{ or } n' = 3 \text{ or } n' = 4 \\ 0.25, & \text{if } n' = 5 \text{ or } n' = 6 \text{ or } n' = 7 \\ 0.125, & \text{if } n' = 8 \text{ or } n' = 9 \text{ or } n' = 10 \end{cases},$$

"||" is an absolute value sign.

Detecting a second digital watermarking information embedded in $S_{dis}$, processing decoding and inverse quantization on the detected second digital watermarking information, so as to obtain a proportion of visual sensitivity coefficients in each filtered coefficient reorganized matrix corresponding to $L_{org}$ embedded at the transmitting terminal in the step ①-9, then calculating a left-view quality value, which is denoted as $Q_{view}^L$, wherein $$Q_{view}^L = \frac{1}{1 + \log_2\left(\frac{K_L}{Q_0} + 1\right)},$$

wherein $Q_0$ is a dynamic adjustor, in this specific embodiment $$Q_0 = 0.1, K_L = \sum_{n'=1}^{10} |P_r^L(n') - P_d^L(n')|,$$

wherein $P_r^L(n')$ represents a proportion of visual sensitivity coefficients in an n'th filtered coefficient reorganized matrix $\overline{S}_{L,org}{}^{n'}$ corresponding to $L_{org}$ embedded at the transmitting terminal in the step ①-9, "||" is an absolute value sign.

Detecting a third digital watermarking information embedded in $S_{dis}$, then processing decoding and inverse quantization on the third digital watermarking information detected, so as to obtain a proportion of visual sensitivity coefficients in each filtered coefficient reorganized matrix corresponding to $R_{org}$ embedded at the transmitting terminal in the step ①-9, then calculating a right-view quality value, which is denoted as $$Q_{view}^R, Q_{view}^R = \frac{1}{1 + \log_2\left(\frac{K_R}{Q_0} + 1\right)},$$

wherein $$K_R = \sum_{n'=1}^{10} |P_r^R(n') - P_d^R(n')|, P_r^R(n')$$

represents a proportion of visual sensitivity coefficients in an n'th filtered coefficient reorganized matrix $\overline{S}_{R,org}{}^{n'}$ corresponding to $R_{org}$ embedded at the transmitting terminal in the step ①-9.

②-10 Calculating a view quality value of $S_{dis}$ according to $Q_{view}^L$ and $Q_{view}^R$, which is denoted as $Q_{view}$, wherein $Q_{view}=(Q_{view}^L+Q_{view}^R)/2$.

②-11 Calculating an objective quality score of the distorted stereo image $S_{dis}$ utilizing a support vector regression model with an optimal weight vector $W^{opt}$ and an optimal bias $b^{opt}$, denoting the objective quality score of the distorted stereo image $S_{dis}$ as $Q_{obj}$, $Q_{obj}=(W^{opt})^T\phi(x)+b^{opt}$, wherein $x=[Q_{dis},Q_{view}]$, x represents a vector constituted by the stereo perception value and the view quality value of the distorted stereo image $S_{dis}$, $(W^{opt})^T$ is a transposed vector of $W^{opt}$, $\phi(x)$ is a linear function of x.

Support Vector Regression (SVR), being a new machine learning method and statistical theory based on empirical risk minimization, is capable of inhibiting over-fitting problem. In the step ②-11, a specific process of setting up a support vector regression model with an optimal weight vector $W^{opt}$ and an optimal bias $b^{opt}$ for calculating an objective quality score of a distorted stereo image $S_{dis}$ comprises the following steps.

Selecting n" original undistorted stereo images, wherein n">1, respectively processing the n" original undistorted stereo images with different types of distortion under different distortion degrees, utilizing the n" original undistorted stereo images and all of the corresponding distorted stereo images to form a training set of stereo images, respectively implementing subjective evaluation on each stereo image in the training set of stereo images to obtain a subjective quality score of each stereo image in the training set of stereo images, denoting the subjective quality score of a j th stereo image in the training set of the stereo images as $DMOS_j$, wherein DMOS is difference mean opinion score, $0 \leq DMOS_j \leq 100$.

According to the method of calculating $Q_{disp}$ and $Q_{view}$ in the step ①-1 to the step ②-10, calculating a stereo perception value and a view quality value of each stereo image in the training set of the stereo images, denoting the stereo perception value of a j th stereo image in the training set of the stereo images as $Q_{disp}(j)$, denoting the view quality value of a j th stereo image in the training set of the stereo images as $Q_{view}(j)$, utilizing the stereo perception value and the view quality value of a j th stereo image in the training set of the stereo images to constitute a vector $x_j$ which is a quality value of a j th stereo image in the training set of the stereo images, $x_j = [Q_{disp}(j), Q_{view}(j)]$, wherein $1 \leq j \leq N'$, N' represents a number of stereo images in the training set of the stereo images.

Utilizing support vector regression to train the quality value and the subjective quality score of all the stereo images in the training set of the stereo images, in such a manner that an error between a regression function value and a subjective quality score is at a minimum value, fitting to obtain an optimal weight vector $W^{opt}$ and an optimal bias $b^{opt}$, and setting up a support vector regression model utilizing $W^{opt}$ and $b^{opt}$.

According to a preferred embodiment of the present invention, in the step ①-3, $L_{org}$ and $R_{org}$ respectively serves as images for processing, and in the step ②-3 $L_{dis}$ and $R_{dis}$ respectively serve as images for processing.

A specific process for processing coefficient reorganization on all of the DCT coefficients in the DCT coefficient matrix of all image blocks in the image for processing comprises following steps as follows:

extracting a DCT coefficient having a coordinate position (1,1) in the DCT coefficient matrix of all the image blocks in the image for processing, so as to form a first coefficient reorganized matrix in sequence, wherein a sequence thereof is in accordance with an order of a coordinate position of each image block in the images for processing;

extracting a DCT coefficient having a coordinate position (1,2) in the DCT coefficient matrix of all the image blocks in the image for processing, so as to form a second coefficient reorganized matrix in sequence, wherein a sequence thereof is in accordance with an order of a coordinate position of each image block in the images for processing;

extracting a DCT coefficient having a coordinate position (2,1) in the DCT coefficient matrix of all the image blocks in the image for processing, so as to form a third coefficient reorganized matrix in sequence, wherein a sequence thereof is in accordance with an order of a coordinate position of each image block in the images for processing;

extracting a DCT coefficient having a coordinate position (2,2) in the DCT coefficient matrix of all the image blocks in the image for processing, so as to form a fourth coefficient reorganized matrix in sequence, wherein a sequence thereof is in accordance with an order of a coordinate position of each image block in the images for processing;

extracting all DCT coefficients having an abscissa $1 \leq i \leq 2$ and an ordinate $3 \leq j \leq 4$ in the DCT coefficient matrix of all image blocks in the image for processing, so as to form a fifth coefficient reorganized matrix in sequence, wherein a sequence thereof is in accordance with an order of a coordinate position of each image block in the images for processing, and multiple DCT coefficients of a DCT coefficient matrix in one image block is in accordance with an order of a coordinate position of the DCT coefficients in the DCT coefficient matrix of the image block;

extracting all DCT coefficients having an abscissa $3 \leq i \leq 4$ and an ordinate $1 \leq j \leq 2$ in the DCT coefficient matrix of all image blocks in the image for processing, so as to form a sixth coefficient reorganized matrixes in sequence;

extracting all DCT coefficients having an abscissa $3 \leq i \leq 4$ and an ordinate $3 \leq j \leq 4$ in the DCT coefficient matrix of all image blocks in the image for processing, so as to form a seventh coefficient reorganized matrix in sequence;

extracting all DCT coefficients having an abscissa $1 \leq i \leq 4$ and an ordinate $5 \leq j \leq 8$ in the DCT coefficient matrix of all image blocks in the image for processing, so as to form an eighth coefficient reorganized matrix in sequence;

extracting all DCT coefficients having an abscissa $5 \leq i \leq 8$ and an ordinate $1 \leq j \leq 4$ in the DCT coefficient matrix of all image blocks in the image for processing, so as to form a ninth coefficient reorganized matrix in sequence; and extracting all DCT coefficients having an abscissa $5 \leq i \leq 8$ and an ordinate $5 \leq j \leq 8$ in the DCT coefficient matrix of all image blocks in the image for processing, so as to form a tenth coefficient reorganized matrix in sequence.

According to a preferred embodiment of the present invention, in the step ①-6, $L_{org}$ and $R_{org}$ respectively serve as images for processing, a specific process for coefficient reorganization on all filtered DCT coefficients in the filtered DCT coefficient matrix of all the image blocks in the image for processing is the same as the specific process in the step ①-3 for coefficient reorganization on all the DTC coefficients in the DCT coefficient matrix of all of the image blocks of the image for processing;

wherein in the step ②-6, $L_{dis}$ and $R_{dis}$ respectively serve as images for processing, a specific process for coefficient reorganization on all filtered DCT coefficients in the filtered DCT coefficient matrix of all the image blocks in the image for processing is the same as the specific process in the step ②-3 for coefficient reorganization on all the DTC coefficients in the DCT coefficient matrix of all the image blocks of the image for processing, which comprises following steps of:

extracting a filtered DCT coefficient having a coordinate position (1,1) in the filtered DCT coefficient matrix of all the image blocks in the image for processing, so as to form a first filtered coefficient reorganized matrix in sequence, wherein a sequence thereof is in accordance with an order of a coordinate position of each image block in the images for processing;

extracting a filtered DCT coefficient having a coordinate position (1,2) in the filtered DCT coefficient matrix of all the image blocks in the image for processing, so as to form a second filtered coefficient reorganized matrix in sequence, wherein a sequence thereof is in accordance with an order of a coordinate position of each image block in the images for processing;

extracting a filtered DCT coefficient having a coordinate position (2,1) in the filtered DCT coefficient matrix of all the image blocks in the image for processing, so as to form a third filtered coefficient reorganized matrix in sequence, wherein a sequence thereof is in accordance with an order of a coordinate position of each image block in the images for processing;

extracting a filtered DCT coefficient having a coordinate position (2,2) in the filtered DCT coefficient matrix of all the image blocks in the image for processing, so as to form a fourth filtered coefficient reorganized matrix in sequence, wherein a sequence thereof is in accordance with an order of a coordinate position of each image block in the images for processing;

extracting all filtered DCT coefficients having an abscissa 1≤i≤2 and an ordinate 3≤j≤4 in the filtered DCT coefficient matrix of all image blocks in the image for processing, so as to form a fifth filtered coefficient reorganized matrixes in sequence, wherein a sequence thereof is in accordance with an order of a coordinate position of each image block in the images for processing, and multiple filtered DCT coefficients of a filtered DCT coefficient matrix in one image block is in accordance with an order of a coordinate position of the filtered DCT coefficients in the filtered DCT coefficient matrix of the image block;

extracting all filtered DCT coefficients having an abscissa 3≤i≤4 and an ordinate 1≤j≤2 in the filtered DCT coefficient matrix of all image blocks in the image for processing, so as to form a sixth filtered coefficient reorganized matrix in sequence;

extracting all filtered DCT coefficients having an abscissa 3≤i≤4 and an ordinate 3≤j≤4 in the filtered DCT coefficient matrix of all image blocks in the image for processing, so as to form a seventh filtered coefficient reorganized matrix in sequence;

extracting all filtered DCT coefficients having an abscissa 1≤i≤4 and an ordinate 5≤j≤8 in the filtered DCT coefficient matrix of all image blocks in the image for processing, so as to form an eighth filtered coefficient reorganized matrix in sequence;

extracting all filtered DCT coefficients having an abscissa 5≤i≤8 and an ordinate 1≤j≤4 in the filtered DCT coefficient matrix of all image blocks in the image for processing, so as to form a ninth filtered coefficient reorganized matrix in sequence; and extracting all filtered DCT coefficients having an abscissa 5≤i≤8 and an ordinate 5≤j≤8 in the filtered DCT coefficient matrix of all image blocks in the image for processing, so as to form a tenth filtered coefficient reorganized matrix in sequence.

The digital watermarking based method for objectively evaluating quality of stereo image of the present invention is processed with experimental verification, so as to demonstrate the effectiveness and feasibility of the method in the present invention. In this preferred embodiment of the present invention, 12 high-definition color original undistorted stereo images are utilized. Left-view images of the 12 original undistorted stereo images are respectively as shown in FIG. 2a, FIG. 2b, FIG. 2c, FIG. 2d, FIG. 2e, FIG. 2f, FIG. 2g, FIG. 2h, FIG. 2i, FIG. 2j, FIG. 2k and FIG. 2l. The 12 high-definition color original undistorted stereo images are respectively processed with 5 distortion treatments such as different levels of JPEG 2000 compression, JPEG compression, Gaussian blur (Gblur), Gaussian white noise (WN), H.264 compression, in such a manner that 312 distorted stereo images are obtained. Furthermore, Difference Mean Opinion Score (DMOS) of each stereo image used is provided simultaneously, wherein a value of the DMOS is obtained from scores provided by observers, and a smaller value thereof represents a better subjective perception quality of the stereo image. In order to test performances of the method of the present invention, following experiment is designed to verify the feasibility and effectiveness of the present invention, and to show the transparency and robustness of the embedded watermarking.

In order to illustrate the method of the present invention better, three performance evaluation indexes are selected for evaluating correlation, consistency and error between the objective quality score obtained by the method of the present invention and the DMOS of the distorted stereo image thereof:

wherein a first index thereof is a Correlation Coefficient (CC) between the objective quality score obtained by the method of the present invention and the DMOS;

wherein a second index thereof is a Spearman Rank-Order Correlation Coefficient (ROCC) between the objective quality score and the DMOS, which reflects monotonicity of the prediction;

wherein a third index thereof is a Root mean squared error (RMSE) between the objective quality score and the DMOS, which reflects error of the prediction;

wherein the more closely to 1 is the value of CC and ROCC and the smaller is the value of RMSE, the performance of an objective evaluation method is better.

In this specific embodiment of the present invention for setting up the support vector regression model, all original undistorted stereo images and their corresponding distorted stereo images of Horse, Akko&Kayo, Lovebird1 and Newspaper are selected for serving as the training set of the stereo images, so as to obtain the optimal weight vector $W^{opt}$ and the optimal bias $b^{opt}$ of the support vector regression model. It is clear that the more training stereo images are used the more accuracy of the support vector resression model will be. In this specific embodiment, the remaining stereo images including Altmoabit, Balloons, Doorflowers, Kendo, LeaveLaptop, Xmas, Puppy, Soccer2 and their corresponding distorted stereo images serve as testing stereo images. The three performance evaluation indexes including the CC, ROCC and the RMSE are shown as in Table 3, which indicates a high correlation between the objective quality score obtained by the method of the present invention and the DMOS by human eyes. Experimental results indicate that the objective quality score obtained by the method of the present invention is approximately consistent with DMOS which is subjective perception resulted by human eyes, which shows the effectiveness and feasibility of the method of the present invention.

TABLE 3

Consistency between the objective quality score of the distorted stereo image obtained in the preferred embodiment and the DMOS

| | All kinds of distortion | JPEG2000 | JPEG | WN | Gblur | H.264 |
|---|---|---|---|---|---|---|
| CC | 0.9077 | 0.9626 | 0.8996 | 0.9139 | 0.9730 | 0.9214 |
| ROCC | 0.9239 | 0.9546 | 0.9068 | 0.8362 | 0.9702 | 0.8793 |
| RMSE | 7.1832 | 3.2670 | 6.1273 | 6.1258 | 4.9489 | 5.3019 |

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A digital watermarking based method for objectively evaluating quality of stereo image, comprising following steps of:

①-1 at a transmitting terminal, denoting an original undistorted stereo image as $S_{org}$, denoting a left-view image of $S_{org}$ as $L_{org}$ and a right-view image of $S_{org}$ as $R_{org}$; dividing $L_{org}$ and $R_{org}$ respectively into $$\frac{M \times N}{8 \times 8}$$

image blocks which are non-overlapped with each other and have a size of 8×8, wherein M is a width of $L_{org}$ or $R_{org}$, N is a height of $L_{org}$ or $R_{org}$;

①-2 processing discrete cosine transform (DCT) on each image block in $L_{org}$ and $R_{org}$, so as to obtain a DCT coefficient matrix of each image block in $L_{org}$ and $R_{org}$;

①-3 processing coefficient reorganization on all DTC coefficients in the DCT coefficient matrix of all of the image blocks in $L_{org}$ and $R_{org}$, so as to obtain 10 coefficient reorganized matrixes which are different from each other and respectively corresponding to $L_{org}$ and $R_{org}$, denoting an n'th coefficient reorganized matrix corresponding to $L_{org}$ as $S_{L,org}^{n'}$, denoting an n'th coefficient reorganized matrix corresponding to $R_{org}$ as $S_{R,org}^{n'}$, wherein DCT coefficients having a same coordinate position in the DCT coefficient matrixes of all the image blocks in $L_{org}$ are located in a same coefficient reorganized matrix, and DCT coefficients having a same coordinate position in the DCT coefficient matrixes of all the image blocks in $R_{org}$ are located in a same coefficient reorganized matrix, wherein $1 \leq n' \leq 10$;

①-4 calculating an absolute value matrix of a difference value of each coefficient reorganized matrix corresponding to $L_{org}$ and each coefficient reorganized matrix corresponding to $R_{org}$, denoting an absolute value matrix of a difference value of an n' th coefficient reorganized matrix $S_{L,org}^{n'}$ corresponding to $L_{org}$ and an n' th coefficient reorganized matrix $S_{R,org}^{n'}$ corresponding to $R_{org}$ as $D_{org}^{n'}$, denoting an l th coefficient of $D_{org}^{n'}$ as $D_{org}^{n'}(l)$, wherein $D_{org}^{n'}(l) = |S_{L,org}^{n'}(l) - S_{R,org}^{n'}(l)|$;

calculating an average value and a standard deviation of the absolute value matrix of the difference value of each coefficient reorganized matrix corresponding to $L_{org}$ and each coefficient reorganized matrix corresponding to $R_{org}$, respectively denoting the average value and the standard deviation of $D_{org}^{n'}$ as $\mu_r^{n'}$ and $\sigma_r^{n'}$, wherein $$\mu_r^{n'} = \frac{1}{L_{n'}} \sum_{l=1}^{L_{n'}} D_{org}^{n'}(l), \quad \sigma_r^{n'} = \sqrt{\frac{1}{L_{n'}-1} \sum_{l=1}^{L_{n'}} (D_{org}^{n'}(l) - \mu_r^{n'})^2};$$

wherein $S_{L,org}^{n'}(l)$ represents an l th DCT coefficient in $S_{L,org}^{n'}$, $S_{R,org}^{n'}(l)$ represents an l th DCT coefficient in $S_{R,org}^{n'}$, wherein "||" is an absolute value sign, $1 \leq l \leq L_{n'}$, wherein $L_{n'}$ represents a total number of DCT coefficients in $S_{L,org}^{n'}$ or $S_{R,org}^{n'}$;

①-5 respectively processing filtering on all of the DCT coefficients in the DCT coefficient matrix of each image block in $L_{org}$ and $R_{org}$ utilizing Watson sensitivity operator, so as to obtain a filtered DCT coefficient matrix of each image block in $L_{org}$ and $R_{org}$;

①-6 respectively processing coefficient reorganization on the DCT coefficients of the filtered DCT coefficient matrix of all the image blocks in $L_{org}$ and $R_{org}$ utilizing the same way of coefficient reorganization as thereof in the step ①-3, so as to obtain 10 filtered coefficient reorganized matrixes which are respectively corresponding to $L_{org}$ and $R_{org}$, and different from each other, denoting an n'th filtered coefficient reorganized matrix corresponding to $L_{org}$ as $\overline{S}_{L,org}^{n'}$, denoting an n'th filtered coefficient reorganized matrix corresponding to $R_{org}$ as $\overline{S}_{R,org}^{n'}$, wherein filtered DCT coefficients having a same coordinate position in the filtered DCT coefficient matrixes of all the image blocks in $L_{org}$ are located in a same filtered coefficient reorganized matrix, and filtered DCT coefficients having a same coordinate position in the filtered DCT coefficient matrixes of all the image blocks in $R_{org}$ are located in a same filtered coefficient reorganized matrix, wherein $1 \leq n \leq 10$;

①-7 according to all of the filtered DCT coefficients in the 10 filtered coefficient reorganized matrixes respectively corresponding to $L_{org}$ and $R_{org}$, calculating a first sensitivity threshold, which is denoted as T1, wherein $$T1 = \alpha \times \sum_{k=1}^{10} \sum_{l=1}^{L_k} |\overline{S}_{org}^k(l)| / \sum_{k=1}^{10} L_k,$$

wherein $\alpha$ is a sensitivity threshold regulatory factor, $1 \leq k \leq 10$, $1 \leq l \leq L_k$, wherein $L_k$ represents a total number of filtered DCT coefficients of a k th filtered coefficient reorganized matrix in the 10 filtered coefficient reorganized matrixes respectively corresponding to $L_{org}$ or $R_{org}$, wherein $\overline{S}_{org}^k(l)$ represents an l th filtered DCT coefficient of a k th filtered coefficient reorganized matrix in the 10 filtered coefficient reorganized matrixes, wherein "||" is an absolute value sign;

①-8 selecting filtered DCT coefficients in each filtered coefficient reorganized matrix respectively corresponding to $L_{org}$ and $R_{org}$ which are greater than the first sensitivity threshold T1 to be determined as visual sensitivity coefficients, calculating proportions of visual sensitivity coefficients in each filtered coefficient reorganized matrix respectively corresponding to $L_{org}$ and $R_{org}$, denoting a proportion of visual sensitivity coefficients in an n' th filtered coefficient reorganized matrix $\overline{S}_{L,org}^{n'}$ corresponding to $L_{org}$ as $P_r^L(n')$, wherein $P_r^L(n') = R_T^L(n')/R^L(n')$, denoting a proportion of visual sensitivity coefficients in an n'th filtered coefficient reorganized matrix $\overline{S}_{R,org}^{n'}$ corresponding to $R_{org}$ as $P_r^R(n')$, wherein $P_r^R(n') = R_T^R(n')/R^R(n')$, wherein $R_T^L(n')$ represents a number of visual sensitivity coefficients in the n' th filtered coefficient reorganized matrix $\overline{S}_{L,org}^{n'}$ corresponding to $L_{org}$, $R^L(n')$ represents a total number of filtered DCT coefficients in the n' th filtered coefficient reorganized matrix $\overline{S}_{L,org}^{n'}$ corresponding to $L_{org}$, $R_T^R(n')$ represents a number of visual sensitivity coefficients in the n'th filtered coefficient reorganized matrix $\overline{S}_{R,org}^{n'}$ corresponding to $R_{org}$, and $R^R(n')$ represents a total number of filtered DCT coefficients in the n'th filtered coefficient reorganized matrix $\overline{S}_{R,org}^{n'}$ corresponding to $R_{org}$;

①-9 processing quantization coding on the average value and the standard deviation of the absolute value matrix of the difference value of each coefficient reorganized matrix corresponding to $L_{org}$ and each coefficient reorganized matrix corresponding to $R_{org}$ for serving as a first digital watermarking information;

processing quantization coding on a proportion of the visual sensitivity coefficients in each filtered coefficient reorganized matrix corresponding to $L_{org}$ for serving as a second digital watermarking information;

processing quantization coding on a proportion of the visual sensitivity coefficients in each filtered coefficient reorganized matrix corresponding to $R_{org}$ for serving as a third digital watermarking information;

utilizing a dither modulation digital watermarking embedding method, respectively embedding the first digital watermarking information into a fourth coefficient reorganized matrix $S_{L,org}^{4}$ corresponding to $L_{org}$ and a fourth coefficient reorganized matrix $S_{R,org}^{4}$ corresponding to $R_{org}$, respectively embedding the second digital watermarking information into a fifth coefficient reorganized matrix $S_{L,org}^{5}$ corresponding to $L_{org}$ and a fifth coefficient reorganized matrix $S_{R,org}^{5}$ corresponding to $R_{org}$, respectively embedding the third digital watermarking information into a sixth coefficient reorganized matrix $S_{L,org}^{6}$ corresponding to $L_{org}$ and a sixth coefficient reorganized matrix $S_{R,org}^{6}$ corresponding to $R_{org}$, in such a manner that a stereo image with digital watermarking is obtained;

①-10 sending the stereo image with digital watermarking to a receiving terminal by the transmitting terminal;

②-1 at the receiving terminal, denoting a received distorted stereo image with digital watermarking for evaluating as $S_{dis}$, $S_{dis}$ is a distorted stereo image of $S_{org}$, denoting a left-view image of $S_{dis}$ as $L_{dis}$, denoting a right-view image of $S_{dis}$ as $R_{dis}$; dividing $L_{dis}$ and $R_{dis}$ respectively into $$\frac{M \times N}{8 \times 8}$$

image blocks which are non-overlapped with each other and have a size of 8×8, wherein M is a width of $L_{dis}$ and $R_{dis}$, N is a height of $L_{dis}$ and $R_{dis}$;

②-2 processing discrete cosine transform (DCT) on each image block in $L_{dis}$ and $R_{dis}$, so as to obtain a DCT coefficient matrix of each image block in $L_{dis}$ and $R_{dis}$;

②-3 processing coefficient reorganization on all DTC coefficients in the DCT coefficient matrix of all of the image blocks in $L_{dis}$ and $R_{dis}$, so as to obtain 10 coefficient reorganized matrixes which are different from each other and respectively corresponding to $L_{dis}$ and $R_{dis}$, denoting an n'th coefficient reorganized matrix corresponding to $L_{dis}$ as $S_{L,dis}^{n'}$ denoting an n'th coefficient reorganized matrix corresponding to $R_{dis}$ as $S_{R,dis}^{n'}$, wherein DCT coefficients having a same coordinate position in the DCT coefficient matrixes of all the image blocks in $L_{dis}$ are located in a same coefficient reorganized matrix, and DCT coefficients having a same coordinate position in the DCT coefficient matrixes of all the image blocks in $R_{dis}$ are located in a same coefficient reorganized matrix, wherein $1 \leq n' \leq 10$;

②-4 calculating an absolute value matrix of a difference value of each coefficient reorganized matrix corresponding to $L_{dis}$ and each coefficient reorganized matrix corresponding to $R_{dis}$, denoting an absolute value matrix of a difference value of an n'th coefficient reorganized matrix $S_{L,dis}^{n'}$ corresponding to $L_{dis}$ and an n'th coefficient reorganized matrix $S_{R,dis}^{n'}$ corresponding to $R_{dis}$ as $D_{dis}^{n'}$, denoting an lth DCT coefficient of $D_{dis}^{n'}$ as $D_{dis}^{n'}(l)$, wherein $D_{dis}^{n'}(l) = |S_{L,dis}^{n'}(l) - S_{R,dis}^{n'}(l)|$;

calculating an average value and a standard deviation of the absolute value matrix of the difference value of each coefficient reorganized matrix corresponding to $L_{dis}$ and each coefficient reorganized matrix corresponding to $R_{dis}$, respectively denoting the average value and the standard deviation of $D_{dis}^{n'}$ as $\mu_d^{n'}$ and $\sigma_d^{n'}$, wherein $$\mu_d^{n'} = \frac{1}{L_{n'}} \sum_{l=1}^{L_{n'}} D_{dis}^{n'}(l), \sigma_d^{n'} = \sqrt{\frac{1}{L_{n'}-1} \sum_{l=1}^{L_{n'}} (D_{dis}^{n'}(l) - \mu_d^{n'})^2};$$

wherein $S_{L,dis}^{n'}(l)$ represents an lth DCT coefficient in $S_{L,dis}^{n'}$, $S_{R,dis}^{n'}(l)$ represents an l th DCT coefficient in $S_{R,dis}^{n'}$, wherein "||" is an absolute value sign, $1 \leq l \leq L_{n'}$, wherein $L_{n'}$ represents a total number of DCT coefficients in $S_{L,dis}^{n'}$ or $S_{R,dis}^{n'}$;

②-5 respectively processing filtering on all of the DCT coefficients in the DCT coefficient matrix of each image block in $L_{dis}$ and $R_{dis}$ utilizing Watson sensitivity operator, so as to obtain a filtered DCT coefficient matrix of each image block in $L_{dis}$ and $R_{dis}$;

②-6 respectively processing coefficient reorganization on the DCT coefficients of the filtered DCT coefficient matrix of all the image blocks in $L_{dis}$ and $R_{dis}$ utilizing the same way of coefficient reorganization as thereof in the step ②-3, so as to obtain 10 filtered coefficient reorganized matrixes which are respectively corresponding to $L_{dis}$ and $R_{dis}$, and different from each other, denoting an n'th filtered coefficient reorganized matrix corresponding to $L_{dis}$ as $\overline{S}_{L,dis}^{n'}$, denoting an n'th filtered coefficient reorganized matrix corresponding to $R_{dis}$ as $\overline{S}_{R,dis}^{n'}$, wherein filtered DCT coefficients having a same coordinate position in the filtered DCT coefficient matrixes of all the image blocks in $L_{dis}$ are located in a same filtered coefficient reorganized matrix, and filtered DCT coefficients having a same coordinate position in the filtered DCT coefficient matrixes of all the image blocks in $R_{dis}$ are located in a same filtered coefficient reorganized matrix, wherein $1 \leq n \leq 10$;

②-7 according to all of the filtered DCT coefficients in the 10 filtered coefficient reorganized matrixes respectively corresponding to $L_{dis}$ and $R_{dis}$, calculating a second sensitivity threshold, which is denoted as T2, wherein $$T2 = \alpha \times \sum_{k=1}^{10} \sum_{l=1}^{L_k} |\overline{S}_{dis}^{k}(l)| / \sum_{k=1}^{10} L_k,$$

wherein $\alpha$ is a sensitivity threshold regulatory factor, $1 \leq k \leq 10, 1 \leq l \leq L_k$, wherein $L_k$ represents a total number of filtered DCT coefficients of a k th filtered coefficient reorganized matrix in the 10 filtered coefficient reorganized matrixes respectively corresponding to $L_{dis}$, or $R_{dis}$, wherein $\overline{S}_{dis}^{k}(l)$ represents an l th filtered DCT coefficient of a k th filtered coefficient reorganized matrix in the 10 filtered coefficient reorganized matrixes respectively corresponding to $L_{dis}$ or $R_{dis}$, wherein "||" is an absolute value sign;

②-8 selecting filtered DCT coefficients in each filtered coefficient reorganized matrix respectively corresponding to $L_{dis}$ and $R_{dis}$ which are greater than the second sensitivity threshold T2 to be determined as visual sensitivity coefficients, calculating proportions of visual sensitivity coefficients in each filtered coefficient reorganized matrix respectively corresponding to $L_{dis}$ and $R_{dis}$, denoting a proportion of visual sensitivity coefficients in an n' th filtered coefficient reorganized matrix $\overline{S}_{L,dis}{}^{n'}$ corresponding to $L_{dis}$ as $P_d^L(n')$, wherein $P_d^L(n')=D_T^L(n')/D^L(n')$, denoting a proportion of visual sensitivity coefficients in an n'th filtered coefficient reorganized matrix $\overline{S}_{R,dis}{}^{n'}$ corresponding to $R_{dis}$ as $P_d^R(n')$, wherein $P_d^R(n')=D_T^R(n')/D^R(n')$, wherein $D_T^L(n')$ represents a number of visual sensitivity coefficients in the n'th filtered coefficient reorganized matrix $\overline{S}_{L,dis}{}^{n'}$ corresponding to $L_{dis}$, $D^L(n')$ represents a total number of filtered DCT coefficients in the n'th filtered coefficient reorganized matrix $\overline{S}_{L,dis}{}^{n'}$ corresponding to $L_{dis}$, $D_T^R(n')$ represents a number of visual sensitivity coefficients in the n' th filtered coefficient reorganized matrix $\overline{S}_{R,dis}{}^{n'}$ corresponding to $R_{dis}$, and $D^R(n')$ represents a total number of filtered DCT coefficients in the n' th filtered coefficient reorganized matrix $\overline{S}_{R,dis}{}^{n'}$ corresponding to $R_{dis}$;

②-9 detecting a first digital watermarking information embedded in $S_{dis}$, processing decoding and inverse quantization on the detected first digital watermarking information, so as to obtain an average value and a standard deviation of the absolute value matrix of the difference value of each coefficient reorganized matrix corresponding to $L_{org}$ and each coefficient reorganized matrix corresponding to $R_{org}$ embedded at the transmitting terminal, processing texture similarity measurement on $S_{dis}$ utilizing Canberra distance, so as to obtain a stereo perception value of $S_{dis}$, which is denoted as $Q_{disp}$, wherein $$Q_{disp} = \frac{\sum_{n'=1}^{10} w_{n'}(|\mu_r^{n'} - \mu_d^{n'}| + |\sigma_r^{n'} - \sigma_d^{n'}|)}{\sum_{n'=1}^{10} w_{n'}(\mu_r^{n'} + \mu_d^{n'} + \sigma_r^{n'} + \sigma_d^{n'})},$$

wherein $\mu_r^{n'}$ and $\sigma_r^{n'}$ respectively represent a average value and a standard deviation of absolute value matrix of the difference value of an n' th coefficient reorganized matrix $S_{L,org}{}^{n'}$ corresponding to $L_{org}$ and an n' th coefficient reorganized matrix $S_{R,org}{}^{n'}$ corresponding to $R_{org}$ embedded at the transmitting terminal, wherein $w_{n'}$ represents a weight, $$w_{n'} = \begin{cases} 1, & \text{if } n' = 1 \\ 0.5 & \text{if } n' = 2 \text{ or } n' = 3 \text{ or } n' = 4 \\ 0.25, & \text{if } n' = 5 \text{ or } n' = 6 \text{ or } n' = 7 \\ 0.125, & \text{if } n' = 8 \text{ or } n' = 9 \text{ or } n' = 10 \end{cases},$$

"||" is an absolute value sign;

detecting a second digital watermarking information embedded in $S_{dis}$, processing decoding and inverse quantization on the detected second digital watermarking information, so as to obtain a proportion of visual sensitivity coefficients in each filtered coefficient reorganized matrix corresponding to $L_{org}$ embedded at the transmitting terminal, then calculating a left-view quality value, which is denoted as $Q_{view}^L$, wherein $$Q_{view}^L = \frac{1}{1 + \log_2\left(\frac{K_L}{Q_0} + 1\right)},$$

wherein $Q_0$ is a dynamic adjustor, $$K_L = \sum_{n'=1}^{10} |P_r^L(n') - P_d^L(n')|,$$

wherein $P_r^L(n')$ represents a proportion of visual sensitivity coefficients in an n'th filtered coefficient reorganized matrix $\overline{S}_{L,org}{}^{n'}$ corresponding to $L_{org}$ embedded at the transmitting terminal, "||" is an absolute value sign;

detecting a third digital watermarking information embedded in $S_{dis}$, then processing decoding and inverse quantization on the third digital watermarking information detected, so as to obtain a proportion of visual sensitivity coefficients in each filtered coefficient reorganized matrix corresponding to $R_{org}$ embedded at the transmitting terminal, then calculating a right-view quality value, which is denoted as $Q_{view}^R$, $$Q_{view}^R = \frac{1}{1 + \log_2\left(\frac{K_R}{Q_0} + 1\right)},$$

wherein $$K_R = \sum_{n'=1}^{10} |P_r^R(n') - P_d^R(n')|, P_r^R(n')$$

represents a proportion of visual sensitivity coefficients in an n'th filtered coefficient reorganized matrix $\overline{S}_{R,org}{}^{n'}$ corresponding to $R_{org}$ embedded at the transmitting terminal;

②-10 calculating a view quality value of $S_{dis}$ according to $Q_{view}^L$ and $Q_{view}^R$, which is denoted as $Q_{view}$, wherein $Q_{view}=(Q_{view}^L+Q_{view}^R)/2$;

②-11 calculating an objective quality score of the distorted stereo image $S_{dis}$ utilizing a support vector regression model with an optimal weight vector $W^{opt}$ and an optimal bias $b^{opt}$, denoting the objective quality score of the distorted stereo image $S_{dis}$ as $Q_{obj}$, $Q_{obj}=(W^{opt})^T\phi(x)+b^{opt}$, wherein $x=[Q_{disp},Q_{view}]$, x represents a vector constituted by the stereo perception value and the view quality value of the distorted stereo image $S_{dis}$, $(W^{opt})$ is a transposed vector of $W^{opt}$, $\phi(x)$ is a linear function of x.

2. The digital watermarking based method for objectively evaluating quality of stereo image, as recited in claim 1, wherein in step ①-3 a specific process for processing coefficient reorganization on all DCT coefficients in the DCT coefficient matrix of all of the image blocks in $L_{org}$ and $R_{org}$, and in step ②-3 a specific process for processing coefficient reorganization on all DTC coefficients in the DCT coefficient matrix of all of the image blocks in $L_{dis}$ and $R_{dis}$ comprise following steps of:

denoting $L_{org}$ or $R_{org}$ or $L_{dis}$ or $R_{dis}$ which is being processed as a image for processing, extracting a DCT coefficient having a coordinate position (1,1) in the DCT coefficient matrix of all the image blocks in the image for processing, so as to form a first coefficient reorganized matrix in sequence;

extracting a DCT coefficient having a coordinate position (1,2) in the DCT coefficient matrix of all the image blocks in the image for processing, so as to form a second coefficient reorganized matrix in sequence;

extracting a DCT coefficient having a coordinate position (2,1) in the DCT coefficient matrix of all the image blocks in the image for processing, so as to form a third coefficient reorganized matrix in sequence;

extracting a DCT coefficient having a coordinate position (2,2) in the DCT coefficient matrix of all the image blocks in the image for processing, so as to form a fourth coefficient reorganized matrix in sequence;

extracting all DCT coefficients having an abscissa $1 \leq i \leq 2$ and an ordinate $3 \leq j \leq 4$ in the DCT coefficient matrix of all image blocks in the image for processing, so as to form a fifth coefficient reorganized matrix in sequence;

extracting all DCT coefficients having an abscissa $3 \leq i \leq 4$ and an ordinate $1 \leq j \leq 2$ in the DCT coefficient matrix of all image blocks in the image for processing, so as to form a sixth coefficient reorganized matrix in sequence;

extracting all DCT coefficients having an abscissa $3 \leq i \leq 4$ and an ordinate $3 \leq j \leq 4$ in the DCT coefficient matrix of all image blocks in the image for processing, so as to form a seventh coefficient reorganized matrix in sequence;

extracting all DCT coefficients having an abscissa $1 \leq i \leq 4$ and an ordinate $5 \leq j \leq 8$ in the DCT coefficient matrix of all image blocks in the image for processing, so as to form an eighth coefficient reorganized matrix in sequence;

extracting all DCT coefficients having an abscissa $5 \leq i \leq 8$ and an ordinate $1 \leq j \leq 4$ in the DCT coefficient matrix of all image blocks in the image for processing, so as to form a ninth coefficient reorganized matrix in sequence; and extracting all DCT coefficients having an abscissa $5 \leq i \leq 8$ and an ordinate $5 \leq j \leq 8$ in the DCT coefficient matrix of all image blocks in the image for processing, so as to form a tenth coefficient reorganized matrix in sequence.

3. The digital watermarking based method for objectively evaluating quality of stereo image, as recited in claim 2, wherein in the step ①-6, $L_{org}$ and $R_{org}$ respectively serve as images for processing, a specific process for coefficient reorganization on all filtered DCT coefficients in the filtered DCT coefficient matrix of all the image blocks in the image for processing is the same as the specific process in the step ①-3 for coefficient reorganization on all the DTC coefficients in the DCT coefficient matrix of all the image blocks of the image for processing;

wherein in the step ②-6, $L_{dis}$ and $R_{dis}$ respectively serve as images for processing, a specific process for coefficient reorganization on all filtered DCT coefficients in the filtered DCT coefficient matrix of all the image blocks in the image for processing is the same as the specific process in the step ②-3 for coefficient reorganization on all the DTC coefficients in the DCT coefficient matrix of all the image blocks of the image for processing.

4. The digital watermarking based method for objectively evaluating quality of stereo image, as recited in claim 1, wherein in the step ①-7 and the step ②-7, $\alpha=3$.

5. The digital watermarking based method for objectively evaluating quality of stereo image, as recited in claim 2, wherein in the step ①-7 and the step ②-7, $\alpha=3$.

6. The digital watermarking based method for objectively evaluating quality of stereo image, as recited in claim 3, wherein in the step ①-7 and the step ②-7, $\alpha=3$.

7. The digital watermarking based method for objectively evaluating quality of stereo image, as recited in claim 4, wherein in the step ②-9, $Q_0=0.1$.

8. The digital watermarking based method for objectively evaluating quality of stereo image, as recited in claim 5, wherein in the step ②-9, $Q_0=0.1$.

9. The digital watermarking based method for objectively evaluating quality of stereo image, as recited in claim 6, wherein in the step ②-9, $Q_0=0.1$.

10. The digital watermarking based method for objectively evaluating quality of stereo image, as recited in claim 1, wherein in the step ②-11, a specific process of setting up a support vector regression model with an optimal weight vector $W^{opt}$ and an optimal bias $b^{opt}$ for calculating an objective quality score of a distorted stereo image $S_{dis}$ comprises following steps of:

selecting n" original undistorted stereo images, wherein n">1, respectively processing the n" original undistorted stereo images with different types of distortion under different distortion degrees, utilizing the n" original undistorted stereo images and all of the corresponding distorted stereo images to form a training set of stereo images, respectively implementing subjective evaluation on each stereo image in the training set of stereo images to obtain a subjective quality score of each stereo image in the training set of stereo images, denoting the subjective quality score of a j th stereo image in the training set of the stereo images as $DMOS_j$, wherein DMOS is difference mean opinion score, $0 \leq DMOS_j \leq 100$;

according to the method of calculating $Q_{disp}$ and $Q_{view}$ in the step ①-1 to the step ②-10, calculating a stereo perception value and a view quality value of each stereo image in the training set of the stereo images, denoting the stereo perception value of a j th stereo image in the training set of the stereo images as $Q_{disp}(j)$, denoting the view quality value of a j th stereo image in the training set of the stereo images as $Q_{view}(j)$, utilizing the stereo perception value and the view quality value of a j th stereo image in the training set of the stereo images to constitute a vector $x_j$ which is a quality value of a j th stereo image in the training set of the stereo images, $x_j=[Q_{disp}(j), Q_{view}(j)]$, wherein $1 \leq j \leq N'$, N' represents a number of stereo images in the training set of the stereo images;

utilizing support vector regression to train the quality value and the subjective quality score of all the stereo images in the training set of the stereo images, in such a manner that an error between a regression function value and a subjective quality score is at a minimum value, fitting to obtain an optimal weight vector $W^{opt}$ and an optimal bias $b^{opt}$, and setting up a support vector regression model utilizing $W^{opt}$ and $b^{opt}$.

\* \* \* \* \*